Jan. 2, 1934.  H. F. GRUMAN  1,941,743
SEWING MACHINE
Filed Jan. 31, 1931   13 Sheets-Sheet 12
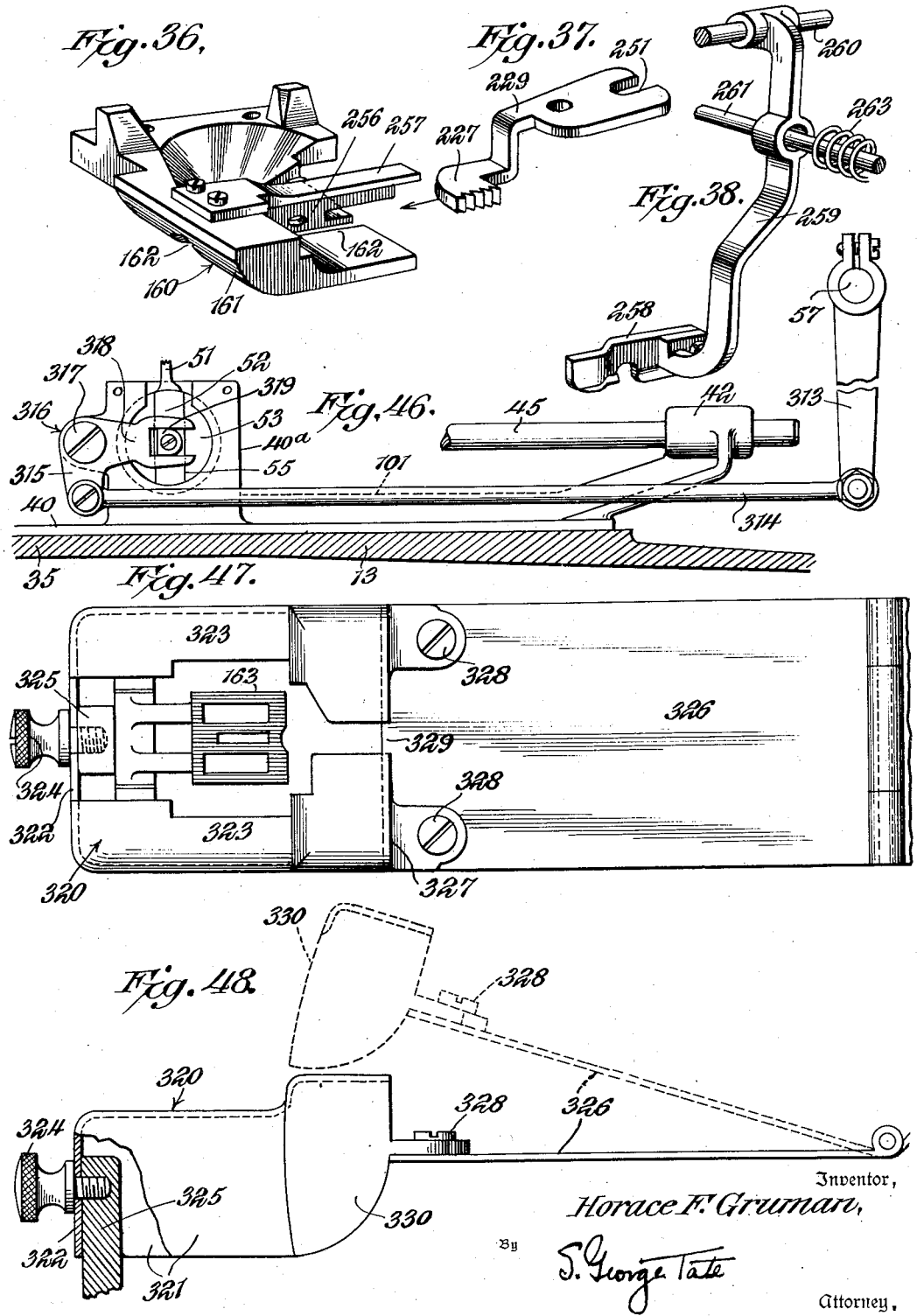

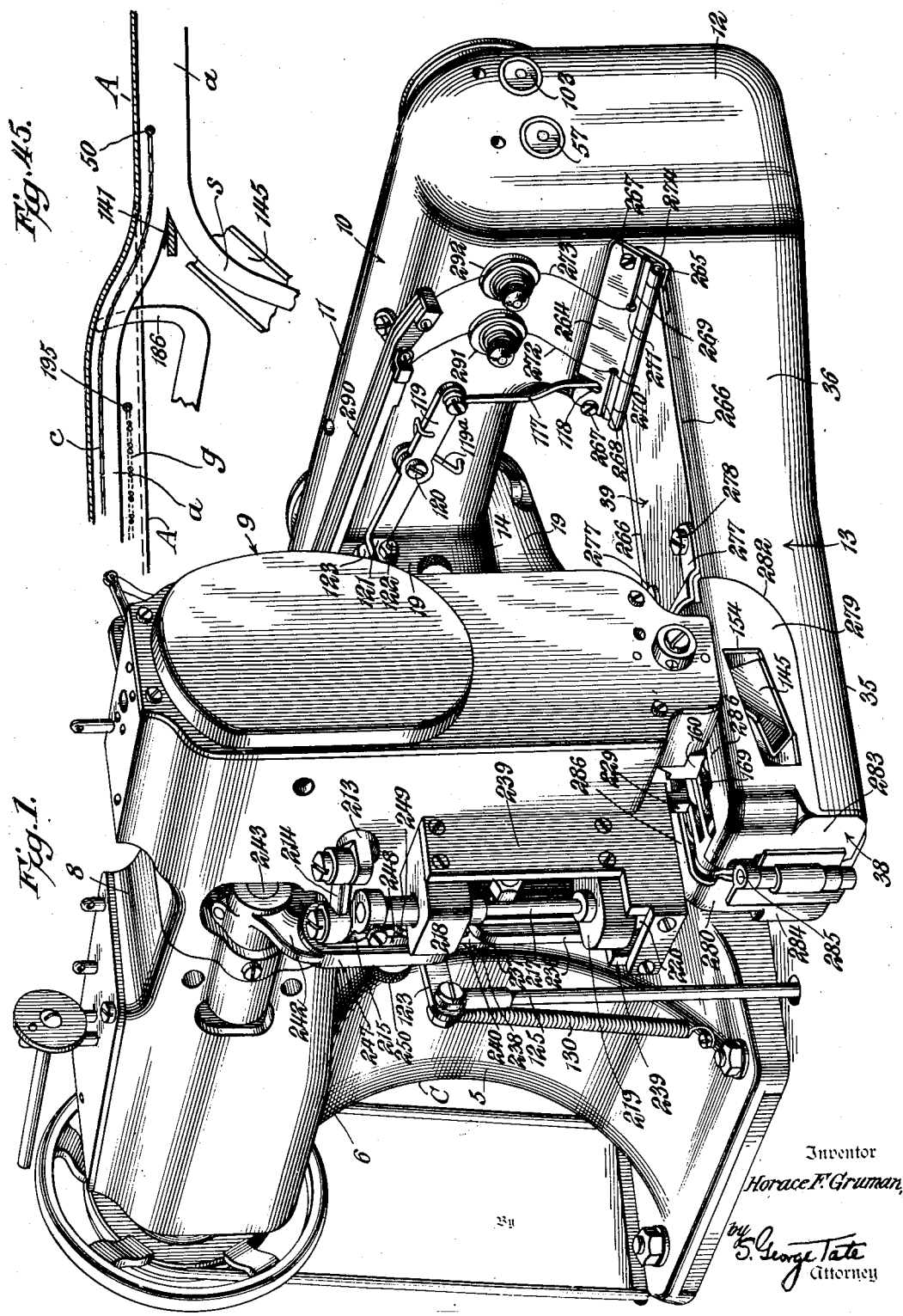

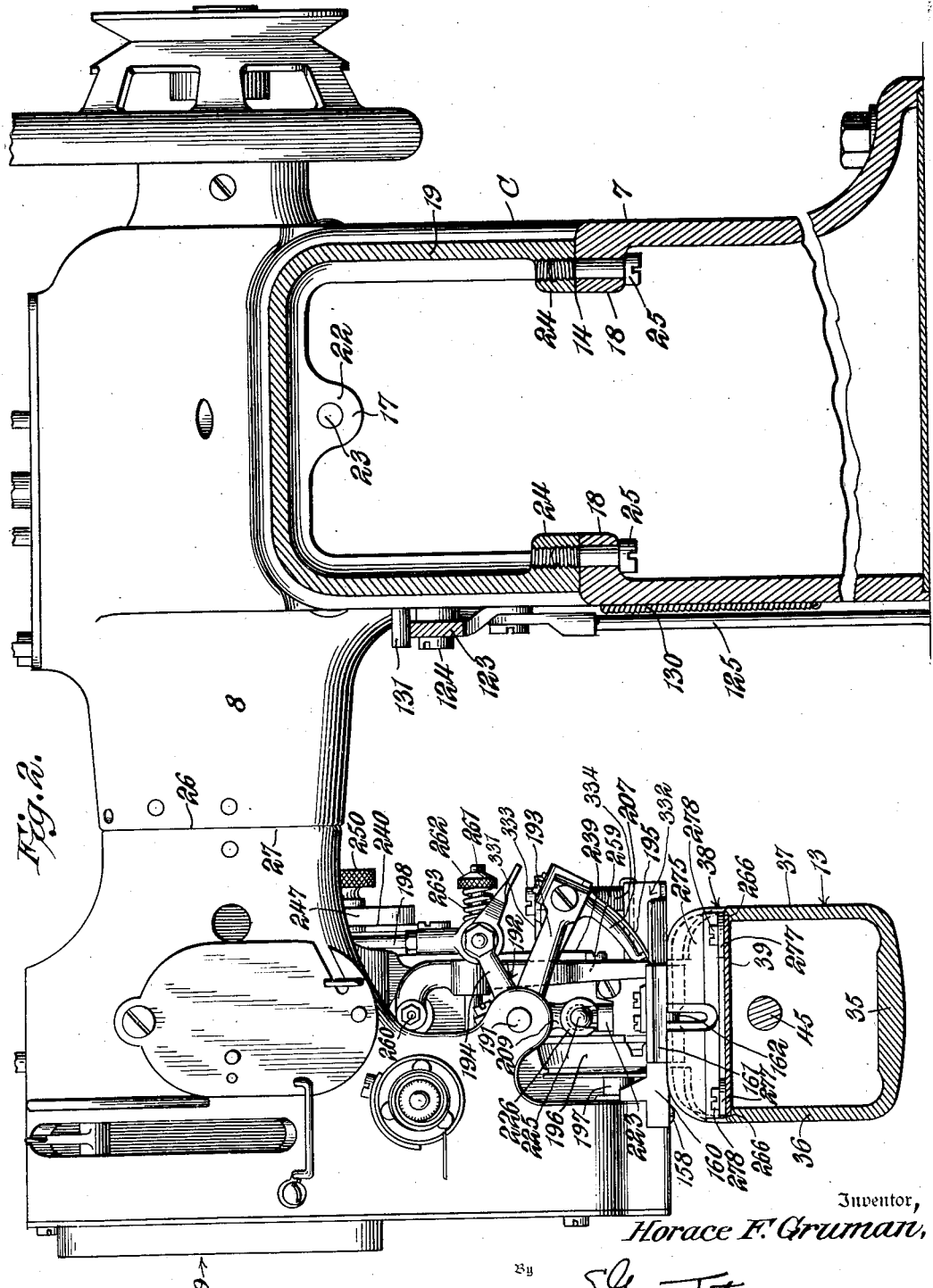

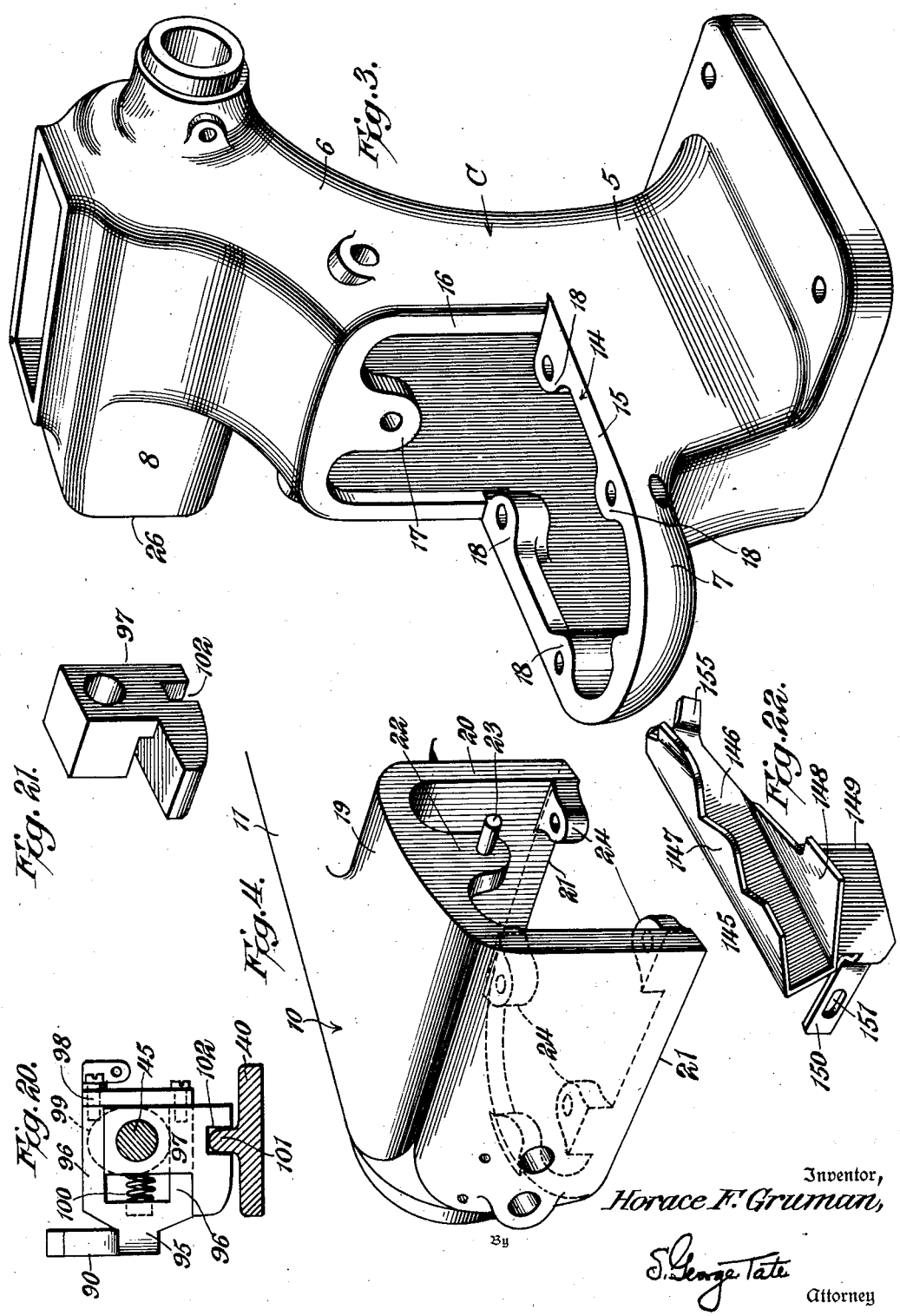

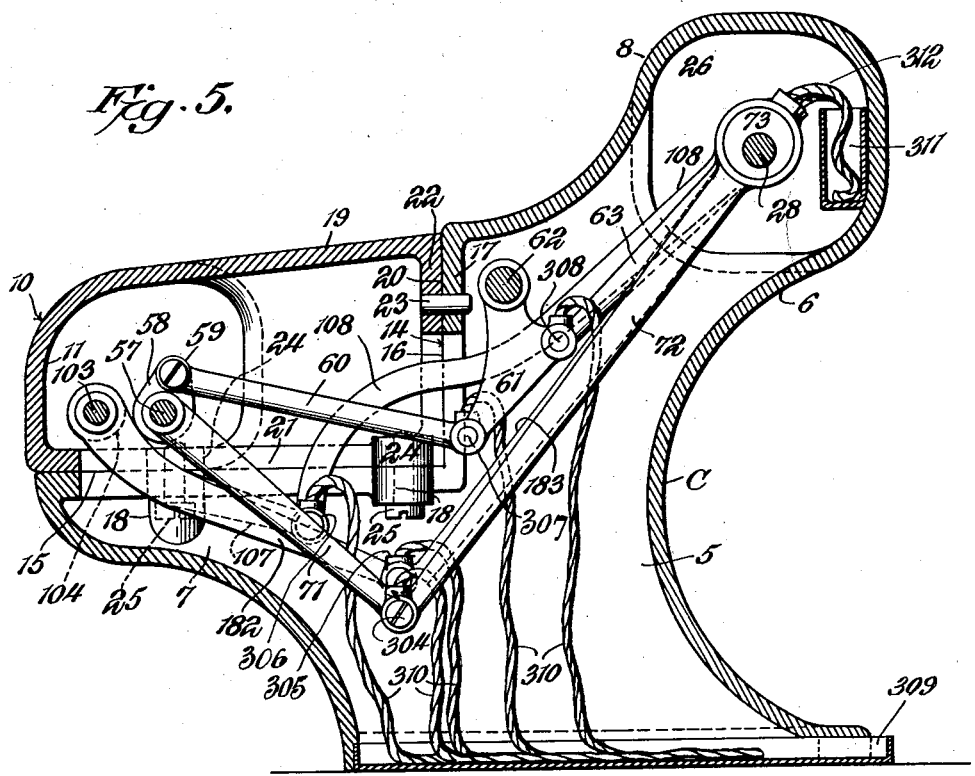
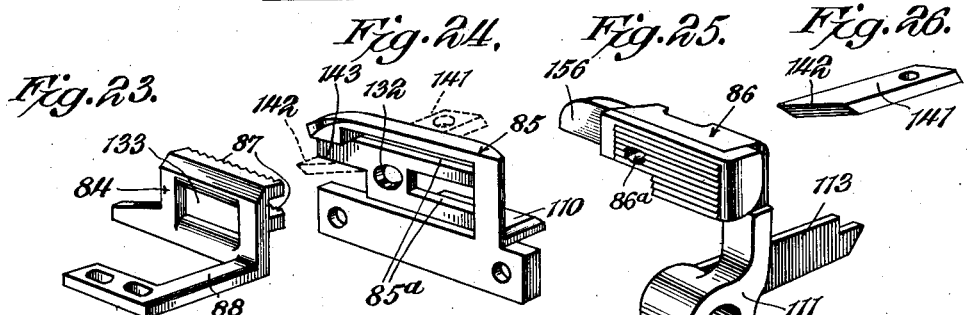
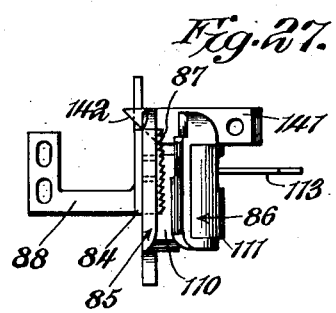

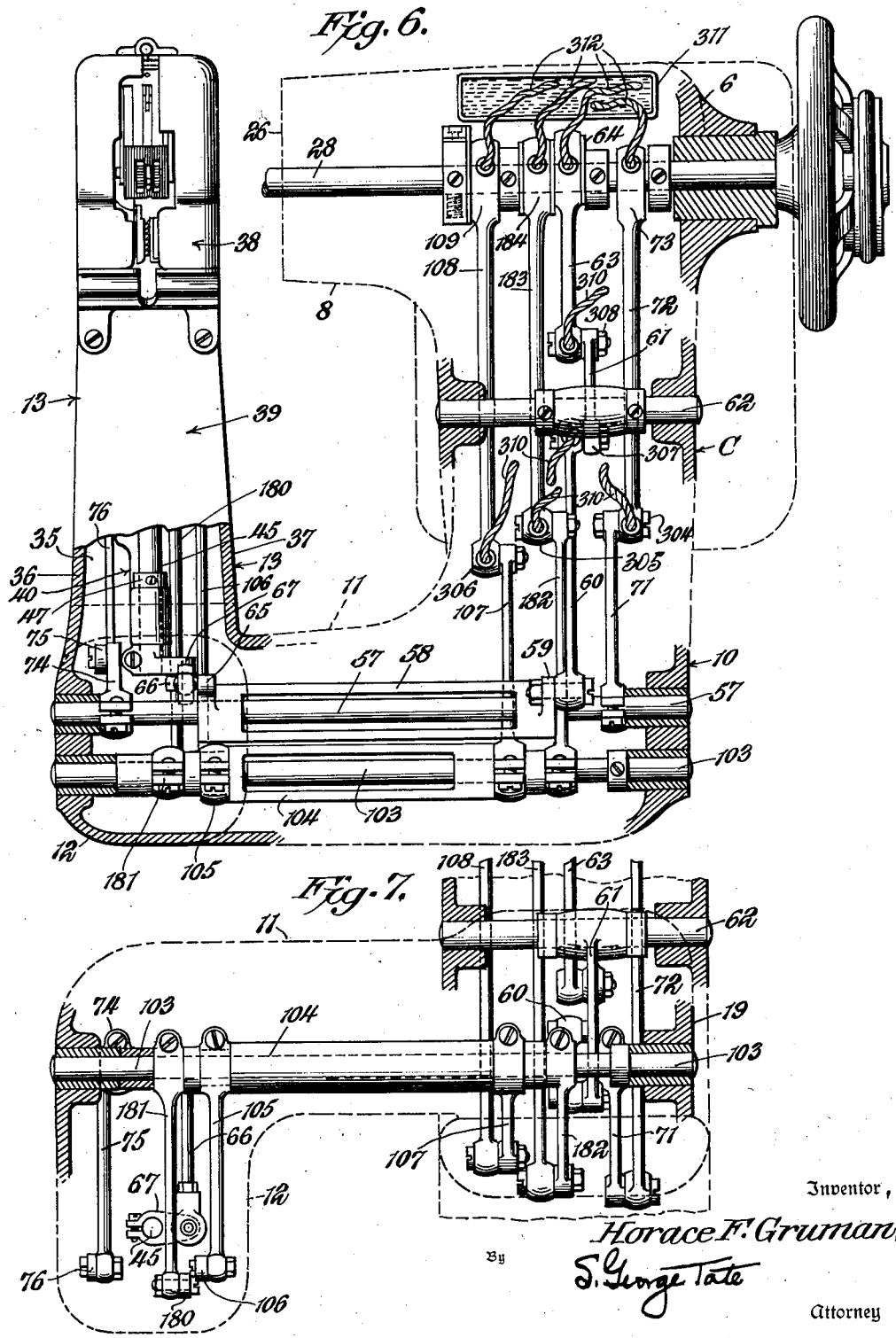

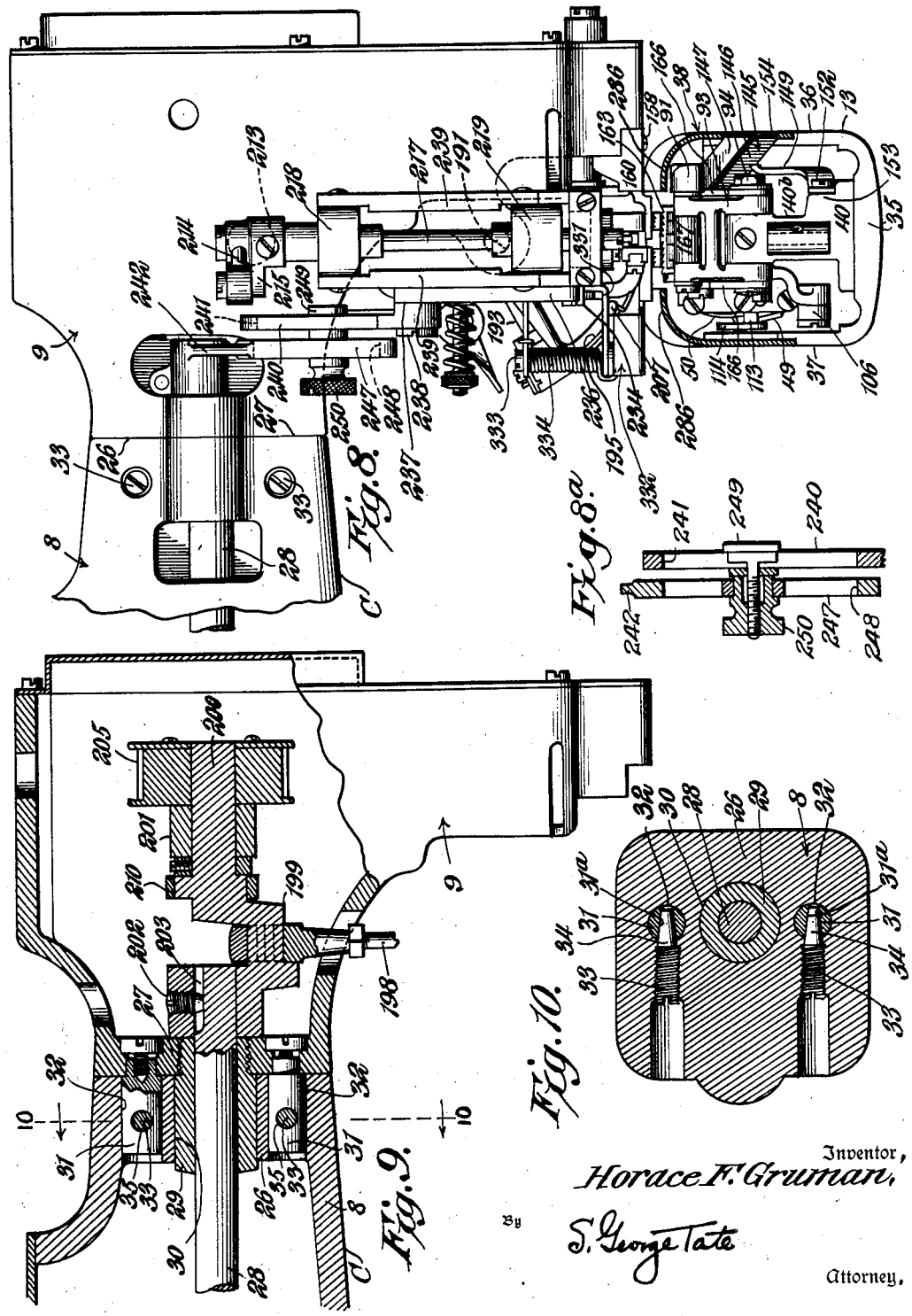

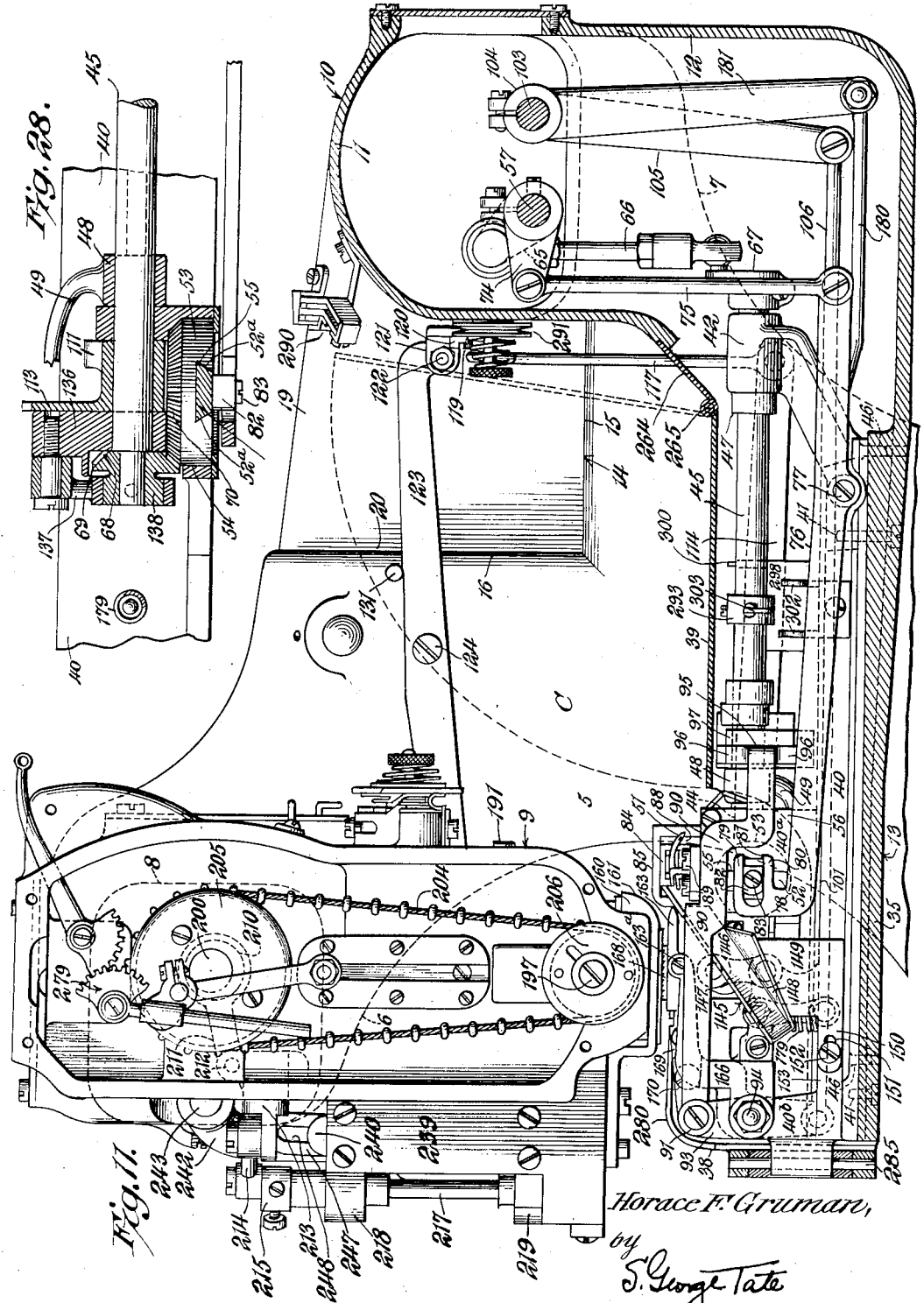

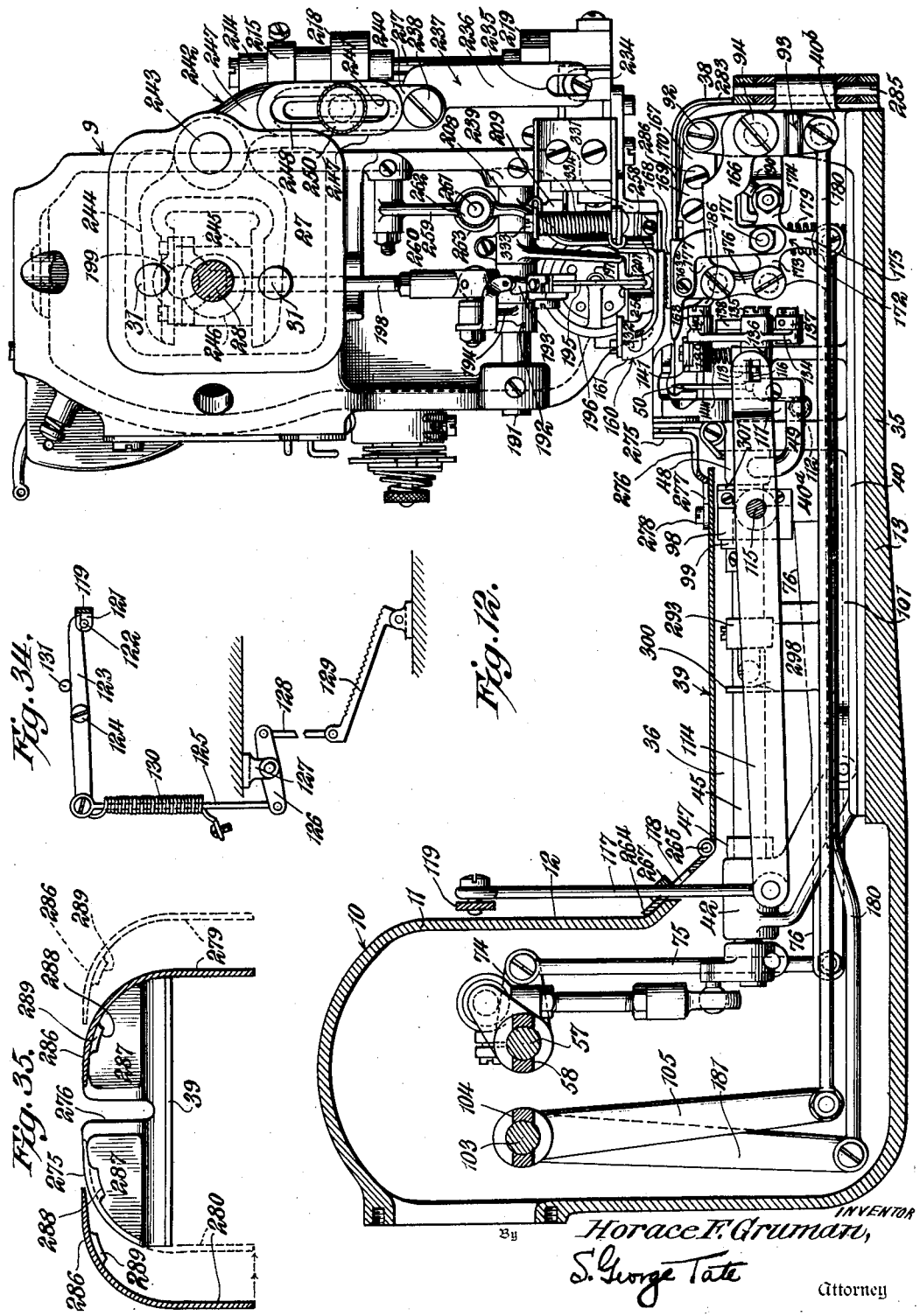

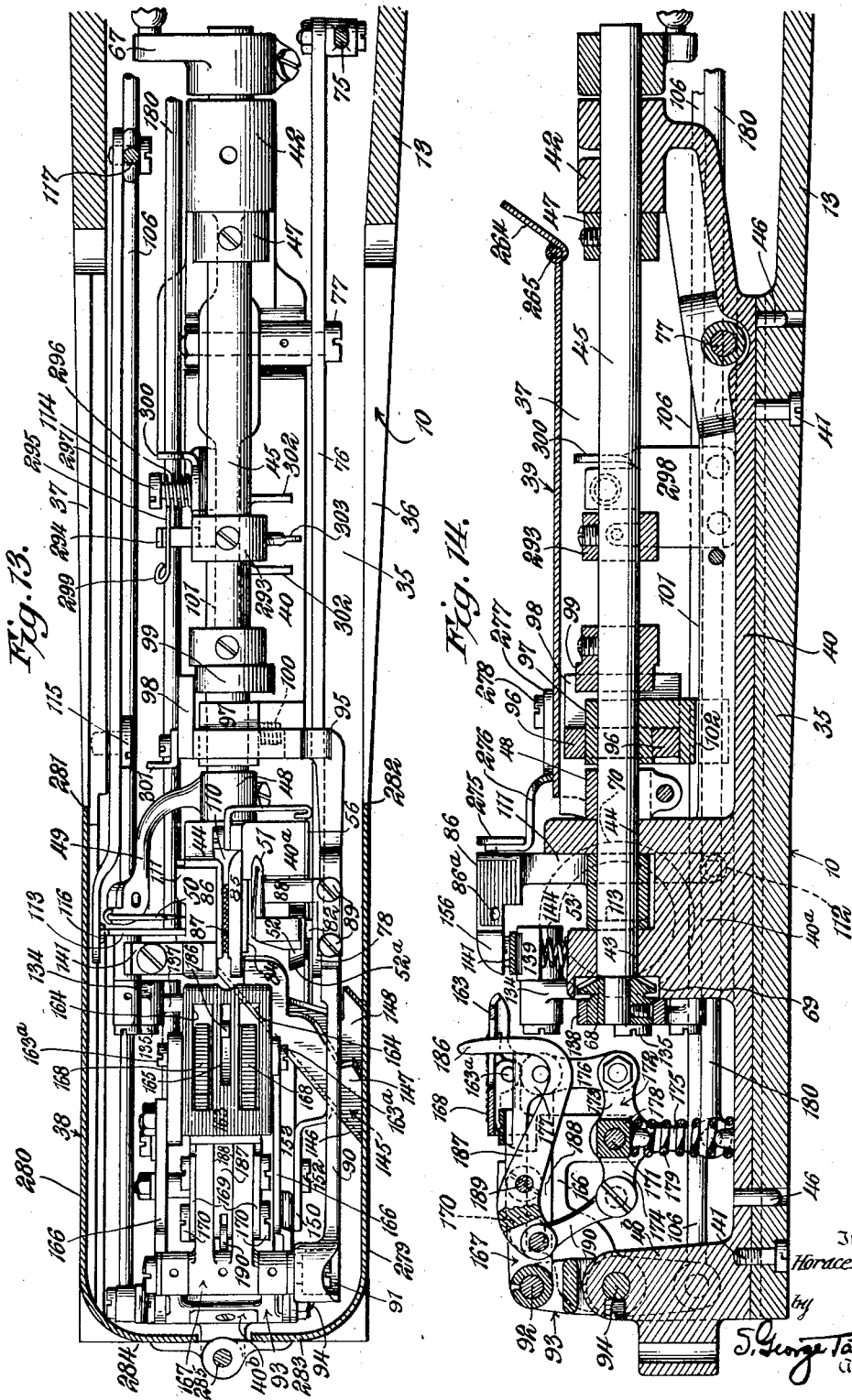

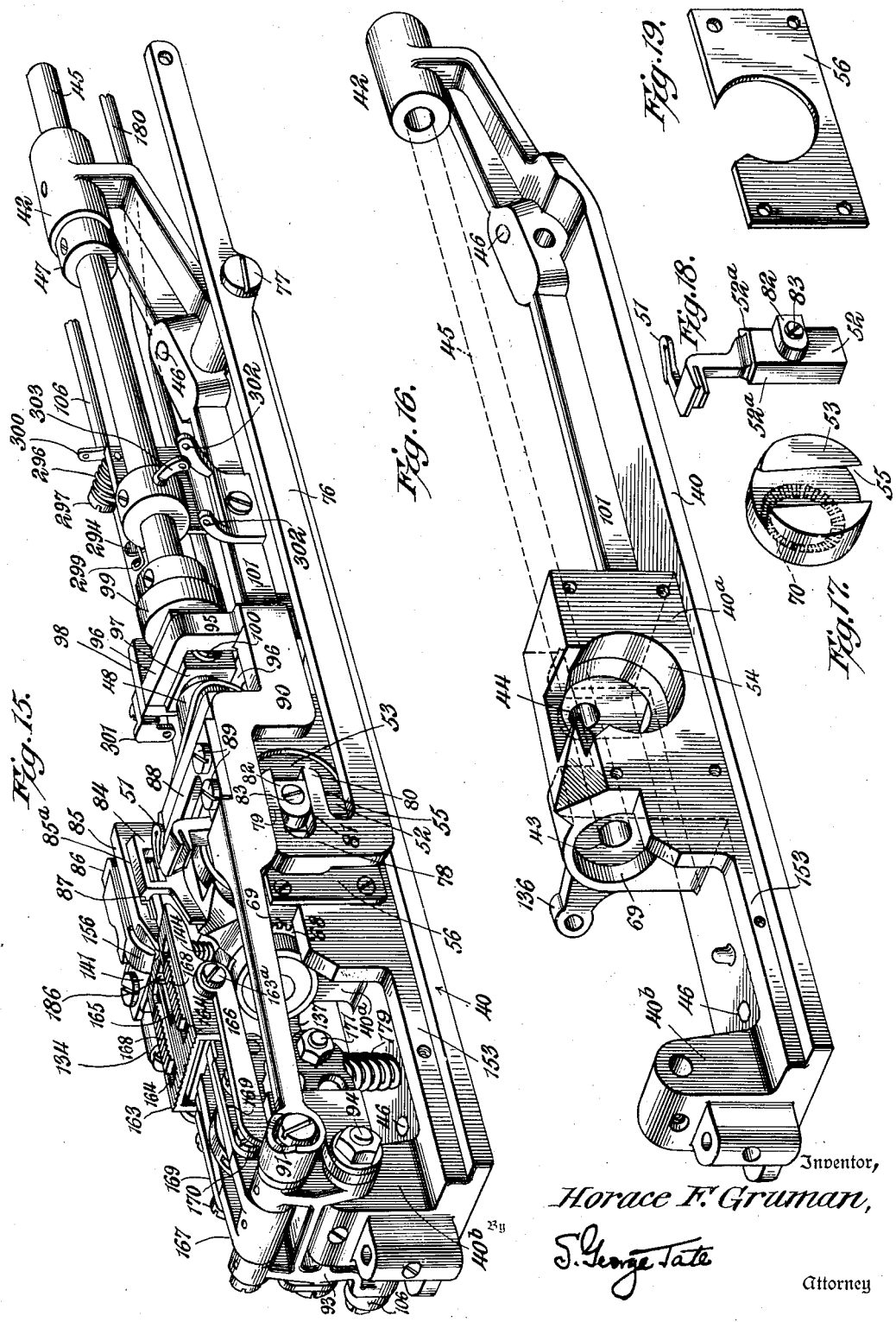

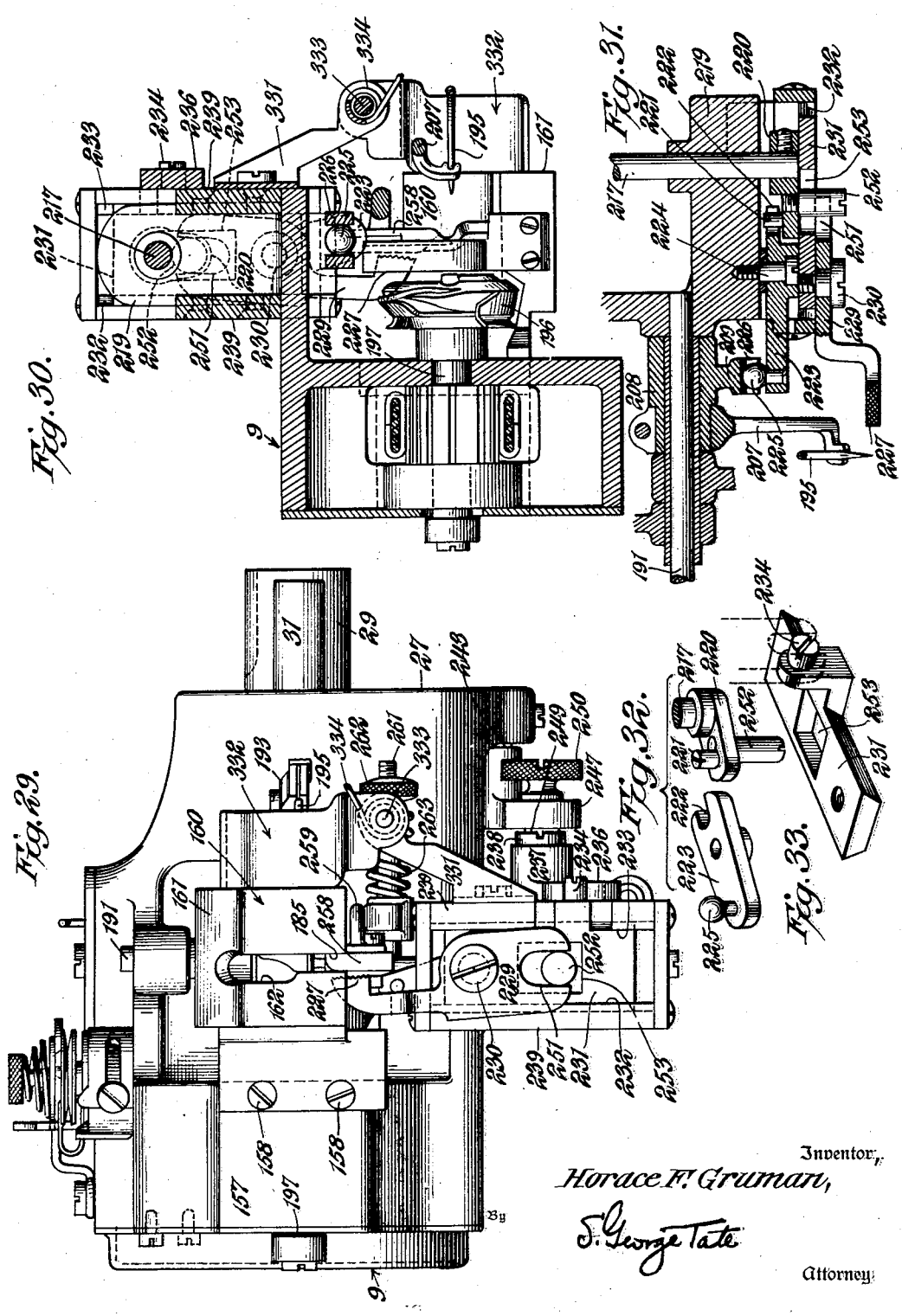

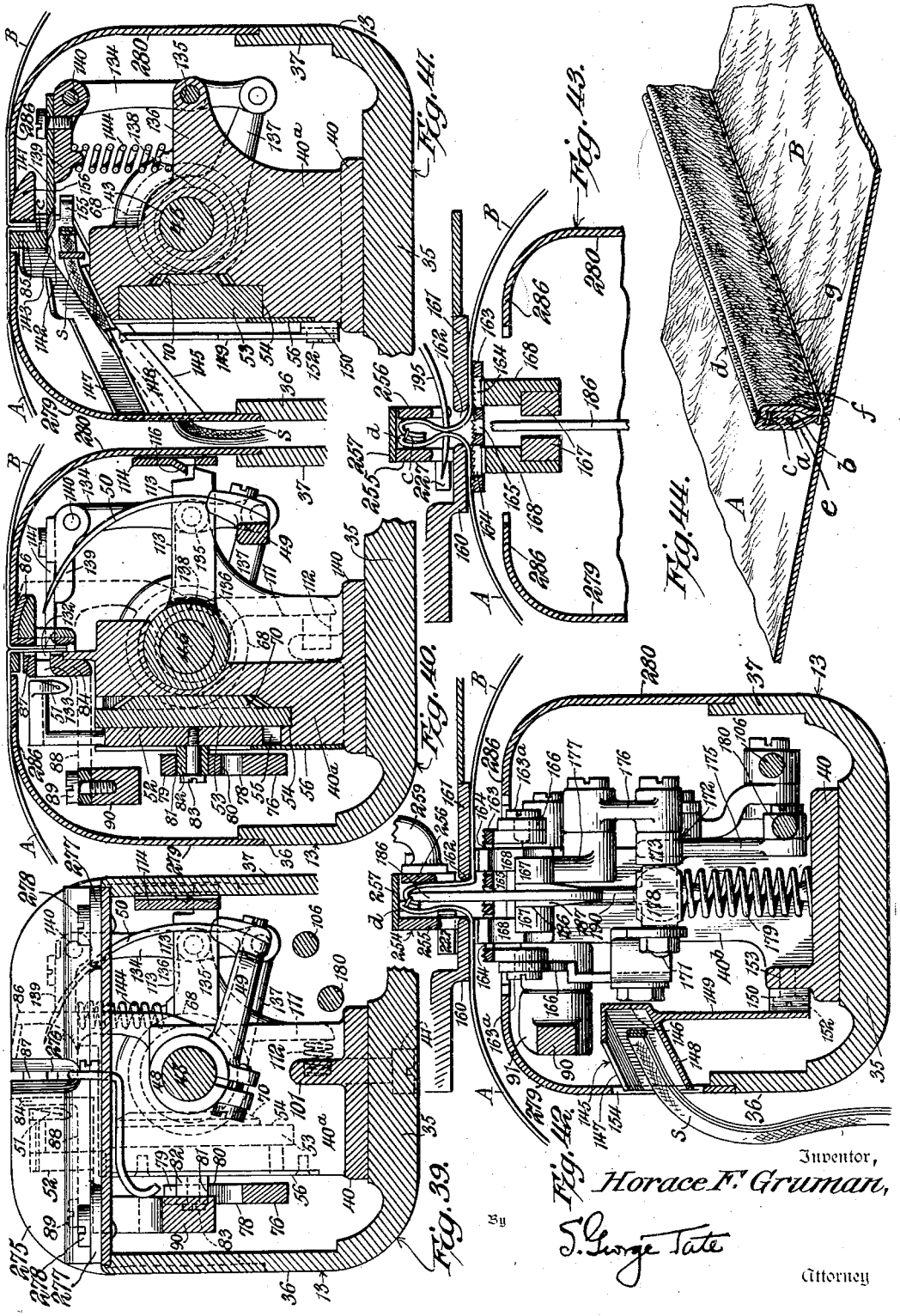

Patented Jan. 2, 1934

1,941,743

UNITED STATES PATENT OFFICE 1,941,743

SEWING MACHINE

Horace F. Gruman, St. Louis, Mo., assignor to Lewis Invisible Stitch Machine Company, St. Louis, Mo., a corporation of Maine Application January 31, 1931. Serial No. 512,661

67 Claims. (Cl. 112—2)

This invention relates to new and useful improvements in sewing machines generally, although more particularly to a sewing machine which in a single operation will join two body fabrics by a French seam, and embodies improvements upon my co-pending applications Serial No. 238,793, filed Dec. 9, 1927, and Serial No. 274,884, filed May 3, 1928 respectively.

In each of my co-pending applications I have disclosed a flat bed sewing machine for forming a French seam in a single operation, but these flat bed machines are necessarily limited to the making of French seams on flat work only and cannot be used for French seaming tubular work such as sleeves, etc.

Among the several objects of the present invention are to provide a sewing machine frame having a tubular work supporting arm and to locate the French seaming mechanism in close proximity to the free end of the arm whereby either tubular work or flat work may be readily French seamed in a single operation; to provide such a machine in which the work is fed off the free end of the work arm; to locate a front stitch forming mechanism entirely within the tubular work arm and a rear stitch forming mechanism entirely above the work arm, and to locate a trimming mechanism within the work arm and intermediate the two stitch forming mechanisms for trimming the edges of the seamed fabrics; to provide a chute for directing the trimmed off strips outwardly from the arm; to provide a mechanism, including a vertical presser foot and a cooperating vertical feed dog, located entirely within the arm for presenting the downturned marginal edge portions of the work to the first stitch forming mechanism and to the trimmer; to provide treadle operated means for moving the vertical foot away from the vertical feed dog for permitting the easy insertion of the initial marginal portions of the fabrics therebetween, the treadle operated means being so arranged with respect to the frame as to avoid any interference to the hands or arms of the operator; to provide a means located in the tubular arm and in rear of the trimmer for forming a ridge in the previously seamed and trimmed fabrics; to provide a mechanism located partly in the tubular arm and partly above said arm for presenting the ridge to the rear stitch forming mechanism whereby the needle of said stitch forming mechanism will penetrate the ridge along a line parallel to but below the trimmed edges of the fabrics; to provide a sewing machine frame of the feed-off-the-arm type wherein the standard is centrally located relative to the overhanging arm and the front horizontal section of the work supporting arm; to provide such a frame with a standard having a forwardly and upwardly extending portion to which one end of the horizontal section of the work supporting arm is detachably connected, whereby the operating parts in the entire work arm may be readily assembled and then attached to the standard; to provide such a frame with a detachable head carrying the entire rear stitch forming mechanism; to provide a removable bracket for supporting the front stitch forming mechanism, the trimming mechanism, the front work presenting mechanism, and the thread controlling mechanisms for the threads of the front stitch forming mechanism, and also a part of the rear work presenting mechanism, whereby the entirety may be initially assembled into a unit, the unit detachably mounted within the tubular work arm, and the movable parts of the unit connected to the operating means therefor; to provide novel means for guiding the threads from the supplies to the needle and looper of the front stitch forming mechanism, and to provide the tubular work arm with an end cap and cover plate so constructed as to permit ready access to the interior of the arm.

With these and other objects in view which will more fully appear, the nature of the invention will be more clearly understood by following the description, the appended claims, and the several views illustrated in the accompanying drawings.

In the drawings:—

Figure 1 is a perspective view of a sewing machine embodying my invention,

Figure 2 is a transverse vertical section thereof, the driving connections in the standard and the mechanism in the work arm being omitted, Figure 3 is a perspective view of the standard, Figure 4 is a perspective view showing particularly the attaching end of the work arm, Figure 5 is a vertical sectional view taken through the machine and showing particularly the driving connections between the main shaft and the rock shafts which are journaled in the front horizontal arm, Figure 6 is a top plan view of the machine more or less diagrammatically showing the driving connections between the main shaft and the mechanisms within the tubular work arm, Figure 7 is a detail front elevation showing the driving connections in the front horizontal arm, Figure 8 is a rear elevation of the stitching head and showing the rear end of the work arm, the end cap of the work arm being shown in section to better disclose the mechanism in said work arm.

Figure 8a is a detail sectional view of a lever driving connection for the top feed, Figure 9 is a detail vertical sectional view showing the means for detachably connecting the stitching head to the overhanging arm of the frame, Figure 10 is a cross sectional view taken on the line 10—10 of Figure 9, Figure 11 is a left hand elevation of the machine, the work arm being shown in section and the cover plate being removed from the head to better disclose the mechanisms contained in said arm and head, Figure 12 is a side elevation showing the right hand side of the stitching head and also showing the work arm in section to better disclose the mechanism contained therein, Figure 13 is an enlarged top plan view of the work arm and the mechanism contained therein, the end cap being shown in section and the cover plate being removed, Figure 14 is a vertical longitudinal section taken centrally through Figure 13, Figure 15 is a perspective view of the unit assembly which is detachably mounted within the work arm, Figure 16 is a perspective view of the bracket which forms a part of the unit assembly, Figure 17 is a perspective view of the looper carriage, Figure 18 is a perspective view of the looper and the looper holder, Figure 19 is a perspective view of the guard plate which retains the looper carrier in its bearing, Figure 20 is a detail cross sectional view showing the means for slidably supporting the front end of the front feed bar, Figure 21 is a perspective view of the bearing block on which the front end of the front feed bar is slidably mounted, Figure 22 is a perspective view of the chute for the trimmed off strips, Figure 23 is a perspective view of the front feed dog, Figure 24 is a perspective view of the front work guide and ledger blade, Figure 25 is a perspective view of the front presser foot, Figure 26 is a perspective view of the movable trimmer blade, Figure 27 is a detail top plan view showing the co-relation between the front feed dog, work guide, presser foot, and movable trimmer blade, Figure 28 is a detail horizontal sectional view showing the means for oscillating the looper carrier from the needle shaft, Fig. 29 is a bottom plan view of the stitching head, Figure 30 is a horizontal sectional view taken directly above the horizontal presser foot of the rear seam forming mechanism, Figure 31 is an enlarged detail vertical sectional view showing the means for imparting four motions to the vertical feed dog of the rear seam forming mechanism and for imparting oscillatory movements to the needle guard of the rear stitch forming mechanism, Figure 32 is a perspective view of the toggle connections employed in oscillating the needle guard of the rear stitch forming mechanism, Figure 33 is a perspective view of the slidable plate employed for imparting backward and forward movements to the vertical feed dog of the rear seam forming mechanism, Figure 34 is a detail view showing the treadle control means for moving the vertical presser foot of the first seam forming mechanism away from its cooperating feed dog, Figure 35 is a transverse vertical section through the end cap showing the means for latching the wings thereof to the cover plate, Figure 36 is a perspective view of the horizontal presser foot of the rear seam forming mechanism, Figure 37 is a perspective view of the vertical feed dog of the rear seam forming mechanism and showing its integral connection with its feed bar, Figure 38 is a perspective view of the vertical presser foot of the second seam forming mechanism, Figure 39 is a vertical cross sectional view taken through Figure 13, Figure 40 is a similar view but taken through Figure 13, Figure 41 is a similar view but taken through Figure 13, Figure 42 is a similar view but taken through Figure 13, Figure 43 is a similar view but the parts in the work arm, however, being omitted, Figure 44 is a perspective view of the French seam, Figure 45 is a diagrammatic sectional view taken in the line of feed, and showing the relation between the body fabrics, the front and rear needles, and the trimmer, Figure 46 is a detail elevation of a modified form of looper avoiding lever mechanism, Figure 47 is a top plan view of a modified form of end cap and cover plate, and Figure 48 is a side elevation thereof.

The method

In the specific method as disclosed in the drawings for forming the French seam as shown in Fig. 44, I first take two body fabrics A and B and turn the adjacent marginal portions a and b out of the general plane of the fabrics into side-by-side relation, these portions a and b being preferably turned downwardly as shown in Fig. 40. These vertical marginal portions while in this relation are then joined by a line of through stitches c which may be of any type, but I prefer the Grover & Baker stitch which is sometime referred to as the "double chain" stitch. I have thus formed what will be hereinafter referred to as the initial or first seam. I then trim the marginal portions a and b below and close to the stitches c by a trimming means as shown in Fig. 41. I then form an upwardly extending ridge d in the seamed and trimmed body fabrics by a suitable means, as shown in Fig. 42. This ridge d extends along the line of the initial seam and includes the latter, the upwardly extending inside marginal portions e and f of the body fabrics being disposed in side-by-side relation and entirely covering or embracing the line of stitches c and the trimmed marginal portions a and b. By the term "inside" I refer to those marginal portions of the fabrics which are inside of the line of stiches c, as distinguished from those marginal portions which are outside of the line of stitches c and which have been trimmed. I then join the upturned inside marginal portions e and f by a line of lock or other stitches g and thereby form the second or final seam, the line of stitches g extending in parallelism with the initial seam but spaced slightly below the trimmed edges thereof. Thus by trimming the marginal portions a and b of the initial seam, I am enabled to form the stitches g close to the stitches c but without showing any of the marginal portions a and b in the finished seam.

Although, I have shown and described the edge portions a and b as being turned downwardly and the ridge d projected upwardly, it will be understood that my invention embraces the idea of the edge portions *a* and *b* being turned upwardly and the ridge *d* being projected downwardly.

The above described method forms the subject matter of my co-pending application Serial No. 504,197, filed Dec. 22, 1930, now Patent 1,866,647, dated July 12, 1932.

*The frame*

In the accompanying drawings, I have disclosed my improved feed-off-the-arm sewing machine frame to which and in combination with which I have shown my improved means for carrying out my new method of forming a French seam, but it is to be understood that from certain aspects my invention is not limited to the use of a sewing machine of the type disclosed.

As shown in the drawings, the frame C embodies a hollow standard 5 which includes an upwardly and rearwardly extending hollow portion 6 and an upwardly and forwardly extending hollow portion 7, an overhanging arm 8 which extends laterally from the upper end of the rearwardly extending portion 6 of the standard, a stitching head 9 detachably connected to the outer end of the overhanging arm 8, and a tubular work arm 10 which is detachably connected at one end to and entirely supported by the upper end of the forwardly extending portion 7 of the standard. The work arm 10 includes a front horizontal arm 11 which is disposed in parallelism with but in a plane lower than the overhanging arm and is connected at one end to the standard as above stated, a vertical or drop arm 12 which depends from the other end of the front arm 11, and a horizontal work supporting arm 13 which is spaced from the standard and extends rearwardly from the lower end of the vertical or drop arm 12 and has its free end terminating under the stitching head 9. It will thus be seen that the standard is located centrally relative to the overhanging arm 8 and the front horizontal arm 11, and therefore the weight of said overhanging arm and said work arm is fairly well distributed, whereby the vibrations of the machine when the latter is operating at high speed, will be reduced to a minimum.

*Connection between the standard and the work supporting arm*

The upper part of the forwardly extending portion 7 of the standard is provided with a right angle cut-out 14 forming an angular seat comprising a horizontal surface 15 and a vertical surface 16. The vertical surface 16 is disposed in a plane parallel with the longitudinal axis of the overhanging arm 8; and the horizontal surface 15 extends forwardly from the bottom of the vertical surface. A perforated centering lug 17 projects downwardly from the top of the forwardly extending portion 7 and the front face of this lug lies in the plane containing the vertical face 16. Fastening lugs 18 project inwardly from opposite sides of the forwardly extending portion 7 and have their upper faces in the plane of the horizontal surface 15. The attaching end of the work arm 10 is provided with an arm 19 which is integral with and extends rearwardly from the front horizontal arm 11 and is shaped to form a right angle including a rear vertical surface 20 and an under horizontal surface 21 so as to fit the seat 14, with the vertical surface 20 abutting the vertical surface 16 and the horizontal surface 21 abutting or resting upon the horiontal surface 15. A perforated centering lug 22 projects downwardly from the rear end of the attaching arm 19 and the rear face of this lug lies in the plane of the vertical surface 20. The lugs 17 and 22 and the perforations thereof are disposed in registration, and a dowel pin 23 is positioned within the perforations to insure proper cooperation between the working instrumentalities in the work arm section 12 and the work instrumentalities mounted on the detachable head 9. Fastening lugs 24 project inwardly from opposite sides of the attaching arm 19 and have their lower faces in the plane of the horizontal surface 21. The fastening lugs 18 and 24 are disposed in registration and are held against movement by fastening screws 25. Thus it will be seen that the work arm 10 is detachably connected to the standard, and that said detachable connection forms the sole supporting means for the work arm.

*Connection between head and overhanging arm*

The outer end of the overhanging arm 8 is closed by a vertical wall 26, and the inner end of the stitching head 9 is closed by a vertical wall 27 which abuts the wall 26. A main rotary shaft 28 is journaled in the overhanging arm 8 and the driven end thereof projects through a bearing 29 into the head 9, the bearing 29 being rigidly connected to the wall 27 of the head, as by threaded engagement, and projecting outwardly from said wall into an opening 30 formed in the wall 26 of the overhanging arm. Dowel pins 31, 31 are fixedly connected to the wall 27 of the head on opposite sides of the bearing 29 and extend outwardly into openings 32, 32 formed in the wall 26 of the overhanging arm. Set screws 33, 33 are threaded into openings formed in the wall 26 and the inner ends 34, 34 of said screws are tapered and engage in transverse openings 31ª, 31ª formed in the dowel pins 31, 31, and thereby not only draw the wall 27 of the head 9 tightly against the wall 26 of the overhanging arm but also maintain said head against turning movement about the shaft 28.

*The work arm*

The work-supporting arm 13 is preferably formed with an open top which extends throughout its length and with an open rear end, and includes a bottom 35, side walls 36 and 37, an end cap 38, and a cover plate 39. The end cap and the cover plate will be later described in detail.

*First seam forming mechanism*

The first or initial seam forming mechanism comprises a stitch forming mechanism and a work presenting mechanism which are located within the work arm 13 adjacent the free end thereof and which are disposed wholly within the confines of the cross sectional area of said arm and below the general plane of the body fabrics A and B. To this end, a bracket 40 as shown in Figs. 14, 15 and 16, is mounted within the arm 13 and extends longitudinally thereof. This bracket is removably attached to the bottom 35 of the arm by screws 41, 41, and includes spaced front and rear bearings 42, 43 and intermediate bearings 44, the rear and intermediate bearings being formed in a post 40ª which is integral with the bracket 40 and extends upwardly into the arm 13. Dowel pins 46, 46, which act as centering pins, also connect the bottom 35 of the arm and the bracket 40.

The stitch forming mechanism includes an oscillatory needle shaft 45 which is journaled in said bearings as shown in Fig. 14. The needle shaft is retained against longitudinal movements relative to the bracket 40 by means of a collar 47 which engages the front bearing 42, and by the hub 48 of a needle arm 49 which is clamped to the shaft at the side of the bearing 44 opposite the bearing 43. The needle arm 49 extends radially from the shaft and thence rearwardly past the right hand side of the bearing post 40a, and attached to the free end of the needle arm is a curved needle 50 which oscillates in an arcuate path extending above the shaft 45 and below the end cap 38, and in a vertical plane at right angles to the longitudinal axis of said shaft. Thus the needle 50 oscillates wholly within the confines of the cross sectional area of the work arm 13. Cooperating with the needle 50 to form the Grover and Baker stitches c is a 4-motion threaded looper 51 which is rigidly connected, preferably integrally, to a looper holder 52 having beveled side edges 52a, 52a. A looper carrier 53 is mounted for oscillatory movements in a recessed bearing 54 formed in the post 40a, the longitudinal axis of the bearing 54 being in a horizontal plane and in a plane at right angles to the longitudinal axis of the needle shaft 45, and the bearing being located on the left hand side of said shaft. It will also be noted that the longitudinal axis of the bearing 54 is in the vertical plane containing the path of travel of the needle 50. The looper carrier 53 is provided on its outer face with a radially extending groove or guiding channel 55 in which the looper holder 52 is mounted for straight line reciprocatory movements. The loop 51 is disposed above the holder 52 and above the carrier 53 and has its loop taking movement towards the operator, or in other words. in a direction opposite the direction of feed. When the carrier 53 is oscillated the looper 51 is given its loop taking and loop shedding movements, and when the looper holder 52 is reciprocated in said carrier the looper is given its needle avoiding movements which, as is well known in the art. is necessary to insure the flat setting of the looper thread in the stitches c. A guard plate 56 which is removably attached to the left hand face of the bearing post 40a, projects slightly beyond the bearing 54 to retain the looper carrier 53 in said bearing.

In order to oscillate the needle shaft 45 from the main shaft 28, I have provided the following driving connections which are located in the upper portion of the standard 5 of the frame:—

A shaft 57 is journaled in the front arm 11 of the frame and a tubular shaft 58 is journaled on the shaft 57. A crank arm 59 is fixed to the right hand end of the tubular shaft 58 and a link 60 is pivotally connected at its forward end to said crank arm 59, the rear end of the link being pivotally connected to the forward end of a lever 61 which depends from and is pivoted to a stationary cross shaft 62 supported by the standard and extending across the upper end thereof. A link or strap 63 is pivotally connected at its front end to the rear end of the lever 61, and the rear end of the link or strap 63 cooperates with an eccentric 64 fixed to the main shaft. Fixed to the left hand end of the tubular shaft 58 is a crank arm 65 to which is pivotally connected the upper end of a link 66 arranged within the vertical or drop arm 12 of the frame, the lower end of the link being pivotally connected to a rock arm 67 clamped to the front end of the needle shaft 45.

In order to oscillate the looper carrier 53 and thereby impart loop entering and loop shedding movements to the looper 51, I have fixedly mounted a driving bevel gear 68 on the rear end of the needle shaft 45 and have protected said gear from lint and the like, by locating said gear in a recess 69 formed in the bearing post 40a. The gear 68 is in constant mesh with a driven bevel gear 70 fixed to the inner face of the looper carrier 53 to oscillate the latter upon oscillation of the needle shaft 45. The gear coupling 68, 70 is a 1-to-1 coupling and consequently the looper travel movement is timed with the needle travel movement whereby the loop taking or entering movement of the looper begins simultaneously with the retractile movement of the needle, and the loop shedding movement of the looper begins simultaneously with the penetrating stroke of the needle.

In order to impart needle-avoiding movements to the looper 51, I have provided the following driving connections between the looper holder 52 and the main shaft 28:—

The rock shaft 57 is provided at its right hand end with a rearwardly extending rock arm 71 which is pivotally connected to the front end of a link or strap 72, the rear end of the latter cooperating with an eccentric 73 fixed to the main shaft 28. Fixed to the left hand end of the shaft 57 is a rock arm 74 to which is pivoted the upper end of a vertical link 75 which is located in the vertical or drop arm 12 of the frame. The lower end of the link 75 is pivotally connected to the front end of a lever 76 which extends longitudinally of the work arm 13 on the left side of the needle shaft 45 and is fulcrumed intermediate its ends on a horizontal pivot screw 77 mounted on the bracket 40. The rear end of the lever 76 is provided with an upstanding head 78 having substantially horizontal arms 79 and 80 and forming therebetween a slot 81. A slide block 82 is fulcrumed on a pivot screw 83 fixed to the looper holder 52, and this block 82 is mounted in the slot 81 for sliding movements relative to the arms 79, 80. Thus when the main shaft 28 oscillates the rock shaft 57, the vertical link 75 will oscillate the lever 76 to raise and lower the looper holder 52 along the groove or guiding channel 55 of the looper carrier 53 and thereby impart needle avoiding movements to the looper. The eccentric 73 is timed whereby the needle avoiding movements will be imparted to the looper at opposite ends of the looper travel. The looper in its forward or loop taking movement passes under the needle, and in its backward or loop shedding movement passes over the needle.

Cooperating with the stitch forming mechanism above described is a work presenting mechanism for intermittently feeding the fabrics A and B up to and past said stitch forming mechanism. This work presenting mechanism includes a vertical feed dog 84, a vertical work guide 85, and a cooperating vertical presser foot 86. The term "vertical" as applied to the feed dog, work guide, and foot denotes a feed dog having its teeth 87 disposed in a vertical plane, a work guide having its operating face in a vertical plane, and a presser foot having the face thereof which cooperates with the feed dog and work guide, disposed in a vertical plane. The teeth 87 of the feed dog are located directly above the needle shaft 45 and in a vertical plane extending longitudinally thereof, and these teeth extend from a point in front of the needle path to a point in rear thereof.

Attached by screws to the right hand face of the bearing post 40ª and projecting upwardly thereabove is the vertical guide or plate 85 having horizontal slots 85ª formed in the upper or projecting portion through which the feed dog 84 operates. The feed dog is provided with a shank 88 which is attached by screws 89 to the intermediate portion of a feed bar 90. The feed bar extends longitudinally of the work arm 13 on the left hand side thereof, and the rear end of the feed bar is pivotally connected by a ball-joint 91 to a pivot bolt 92 extending across the upper end of an H-shaped feed rocker or lever 93 which is fulcrumed intermediate its ends on a horizontal pivot bolt 94 to a post 40ᵇ located at and within the rear end of the work arm and integrally connected to the removable bracket 40. The front end of the feed bar is provided with a laterally extending fork 95 whose arms 96, 96 are disposed above and below the needle shaft 45. A slide block 97 is freely mounted on the needle shaft and is located between the arms of said fork for sliding contact therewith. The right hand end of the fork is closed by a cam plate or follower 98 which projects forwardly therefrom for constant engagement with a peripheral cam 99 fixed on the needle shaft 45. A coil spring 100 is disposed between the feed bar 90 and the slide block 97 and serves to yieldingly retain the cam plate or follower 98 in constant engagement with the cam 99. A tongue or rib 101 integral with the bracket 40 in the work arm 13 and extending longitudinally thereof, cooperates with a guide groove 102 formed in the lower part of the slide block and retains the latter against axial movements about the needle shaft 45. As thus far described it will be apparent that the forward end of the feed bar 90 is slidably supported on the block 97 and the rear end is pivotally supported by the feed rocker or lever 93; that the feed rocker will impart backward and forward movements to the feed dog, and that the cam 99 and cam follower 98 will impart lateral reciprocations to the feed dog. In order to oscillate the feed rocker 93 from the main shaft 28, and thereby impart feeding movements to the feed dog, a shaft 103 is journaled in the front horizontal arm 11 of the frame in front of the shafts 57 and 58 and journaled on this shaft 103 is a tubular shaft 104. A rock arm 105 is fixed to the left hand end of the shaft 104 and extends downwardly into the vertical or drop arm 12 of the frame, and is pivotally connected to the front end of a link 106 which extends along and within the work arm 13 on the right hand side of the needle shaft 45, the rear end of the link being pivotally connected to the lower end of the feed rocker or lever 92. A rock arm 107 which is fixed to the right hand end of the tubular shaft 104, extends rearwardly into the standard 5 of the frame and the rear end of said arm is pivotally connected to the forward end of a link or strap 108 which cooperates at its rear end with an eccentric 109 fixed on the main shaft 28.

The vertical work guide 85 below the feed dog slots 85ª thereof, is provided with a horizontal and integral shelf 110 which extends laterally towards the presser foot 86 and serves as a guide to determine the depth of the marginal portions $a$ and $b$ of the fabrics when the work presenting mechanism is in operation.

The presser foot 86 is integrally connected to a downwardly extending lever 111 which is fulcrumed intermediate its ends on the needle shaft 45 so as to swing towards and from the feed dog 84 and work guide 85. A coil spring 112 is disposed between the lower end of the lever 111 and the tongue or rib 101 which is integral with the bracket 40 in the work arm 13, and functions to retain the presser foot 86 in yieldable engagement alternately with the feed dog 84 and the work guide 85. In order to facilitate the insertion of the marginal portions $a$ and $b$ of the fabrics between the feed dog 84 and the work guide 85 on the one hand, and the presser foot 86 on the other hand, it is desirable to provide a foot operated means for swinging the presser foot away from said feed dog and work guide. To this end, I have provided the presser foot lever 111 with a laterally extending rock arm 113 which terminates short of the wall 37 of the work arm 13. An operating lever 114 extends longitudinally of the arm on the right hand side of the needle shaft 45 and is fulcrumed intermediate its ends on a horizontal pivot screw 115 fixed to the wall 37 of said arm at a point in front of the foot.

The rear end of the operating lever 114 is disposed between the end of the rock arm 113 and the wall 37, and is provided with a nose 116 which extends laterally and is disposed above the end of the rock arm. The front end of the lever 114 is located slightly in rear of the vertical or drop arm 12 of the frame, and is pivotally connected to the lower end of a link 117 which extends upwardly through an opening 118 formed in the cover plate 39. The upper end of the link 117 is pivotally connected to the left hand end of a lever 119 which extends along the rear face of the front horizontal arm 11 of the frame and is fulcrumed on a pivot screw 120 attached to said arm. A coil spring 119ª is disposed around the pivot screw 120 and one end of the spring extends over the left hand end of the lever 119 and the other end of said spring is positioned in a hole formed in the front horizontal arm 11 of the frame. This spring 119ª functions to yieldably retain the nose 116 of the presser foot operating lever 114 above and in spaced relation to the rock arm 113 of the presser foot and thereby permit the presser foot to oscillate under the influence of the feed dog 84 without imparting said oscillatory movements to the operating lever 114. The right hand end of the lever 119 is provided with an ear 121 carrying a pin 122. A lever 123 extends along the left hand face of the standard 5 and is fulcrumed intermediate its ends on a pivot screw 124 attached to the standard, the front end of said lever 123 being disposed directly above the pin 122. A downwardly extending link 125 is pivotally connected at its upper end to the rear end of the lever 123, and the lower end of said link is pivotally connected to a lever 126 which is fulcrumed to a bracket 127 adapted to be attached to the under face of the table on which the sewing machine is mounted.

A downwardly extending link 128 is pivotally connected at its upper end to the other end of the lever 126, and the lower end of this link is pivotally connected to a foot treadle 129 which is pivotally mounted on the floor. In order to maintain the treadle 129 in its normal upwardly inclined position and to normally maintain the lever 123 in its normal inoperative position, I have provided a coil spring 130 around the link 125, the upper end of the spring being connected to the rear end of the lever 123 and the lower end of the spring being connected to the standard 5 of the frame. This spring, therefore, normally tends to pull downwardly the rear end of the lever 123 and also retain the treadle 129 in it upwardly inclined position, the movement of the lever 123 under the influence of the spring 130 being limited by a stop pin 131 which is attached to the standard 5 of the frame and is located above the front end of the lever 123. Thus when the treadle 129 is depressed the link 125 is moved upwardly against the tension of the spring 130, the front end of the lever 123 is moved downwardly and by its engagement with the pin 122 the lever 119 is rocked against the tension of the spring 119ª. The link 117 is thereby lifted and the presser foot operating lever 114 is rocked so as to move the rear end thereof downwardly causing the nose 116 to engage the rock arm 113 and thereby swing the presser foot lever 111 about the needle shaft 45 against the tension of the spring 112 and thereby move the presser foot 86 away from the feed dog 84 and the stationary work guide 85. When the operator releases the treadle 129 the parts will return to their normal positions under the influences of the springs 112, 119ª, and 130. It will be noted that the lever and link connections between the presser foot and the treadle extending around the work supporting arm 10 of the frame and consequently these parts offer no obstruction or interference either to the arms of the operator or to the material being handled. The needle 50 in its travel passes through an opening 86ª in the presser foot 86, through an opening 132 formed in the stationary work guide 85 above the shelf 110, and through an opening 133 formed in the presser foot 86.

Trimming mechanism

Located within the work arm 13 in rear of the first stitch forming mechanism is a trimming mechanism for trimming the edges of the downwardly turned edge portions $a$ and $b$ of the fabrics. This trimming mechanism includes a vertically disposed trimmer lever 134 which is fulcrumed intermediate its ends on a horizontal pivot screw 135 fixed to a laterally projecting arm 136 of the bearing post 40ª. This arm 136 projects towards the right from the needle shaft 45. The lower end of the trimmer lever 134 is pivotally connected to one end of a link or strap 137, the other end of said link or strap cooperating with an eccentric 138 fixed to the rear end of the shaft 45. A supporting arm 139 is pivotally connected as at 140 to the upper end of the trimmer lever 134. Removably attached to the supporting arm 139 is a movable trimmer blade 141 having a beveled cutting edge 142. The blade 141 is disposed under and in contact with a ledger blade 143 which is formed as an integral part of the stationary work guide or plate 85, said ledger blade being located in rear of the needle opening 132. A coil spring 144 is disposed between the arm 136 of the bearing post 40ª and the pivoted supporting arm 139 and functions to yieldably retain the movable trimmer blade 141 in cooperative cutting relation with the stationary ledger blade 143. It will be noted that the rear end of the feed dog 84 is disposed above the path of movement of the movable trimmer blade 141 and consequently the marginal portions $a$ and $b$ of the fabrics are fed rearwardly up to the movable trimmer blade, and that the movable trimmer blade has its path of movement slightly below the path of movement of the needle 50 and consequently the marginal portions $a$ and $b$ will be trimmed off along the line slightly below the line of stitches $c$. The trimmed off strips $s$ are directed outwardly from the work arm 13 through the medium of a chute 145 which is preferably formed of sheet metal and includes a vertical wall 146, a top 147 and a bottom 148. This chute is removably attached to the work arm 13 through the medium of a supporting bracket 149 having a horizontally disposed shank 150 formed with an opening 151. The shank 150 is rigidly attached by a screw 152 to a rib 153 integrally formed on the bracket 40. The chute 145 is normally inclined downwardly from the point of trimming so as to position the outlet end of the chute within an opening 154 formed in the end cap 38. The inlet or receiving end of the chute is formed with a forwardly projecting guide finger 155 which is disposed on the right hand side of the marginal portions $a$ and $b$ of the fabrics and under a finger 156 which projects rearwardly from the presser foot 86, the finger 155 functioning to direct the trimmed off strips $s$ through the chute along which they gravitate outwardly through the end cap.

Second seam forming mechanism

Disposed in rear of the first seam forming mechanism and the trimming mechanism, is a second seam forming mechanism which includes a rear stitch forming mechanism supported on the head 9 of the frame and entirely disposed above the general plane of the fabrics, and a rear work presenting mechanism for forming an upwardly projecting ridge in the previously seamed and trimmed fabrics and for feeding said ridge into position to be seamed by the rear stitch forming mechanism whereby the side portions of the ridge will be seamed by a line of stitches disposed in parallelism with but below the trimmed edges of the fabrics.

The rear work presenting mechanism includes a horizontally disposed stationary presser foot 160 which is rigidly attached to the head 9 by screws 158, 158. This presser foot 160 is provided with an upwardly curved guiding toe 161 at its front end and is formed with a longitudinally extending opening 162 through which the ridge $d$ of the fabrics is projected into position preparatory to the formation of the line of stitches $g$. Disposed below the stationary presser foot 160 and cooperating therewith to intermittently clamp the fabrics A and B on opposite sides of the ridge $d$, is a work clamp 163 which is formed with spaced feed slots 164, 164 and an intermediate slot 165. The work clamp 163 is pivoted by screws 163ª, 163ª centrally between its front and rear ends to spaced arms 166, 166 which extend rearwardly and have their rear ends pivotally mounted on the pivot bolt 94 of the feed rocker or lever 93. It will, therefore, be seen that the feed rocker 93 does not impart any longitudinal movement to the work clamp. A feed bar 167 extends longitudinally between the arms 166, 166 and has its rear end journaled on the pivot bolt 91 of the feed rocker or lever 93. A pair of horizontal 4-motion feed dogs 168, 168 are provided with rearwardly extending shanks 169, 169 which are attached to the side faces of the feed bar 167 by screws 170, the feed dogs operating in the feed slots 164 of the clamp plate 163 and cooperating with the presser foot 160 on opposite sides of the ridge $d$. A transverse pivot bolt 171 is fixed to the supporting arms 166, 166 of the work clamp and fulcrumed on this pivot bolt 171 is a 3-armed lever 172 comprising a forwardly extending arm 173, a rearwardly extending arm 174, and a downwardly extending arm 175.

Pivotally connected to the forward end of the arm 173 is an upwardly extending link 176 and the upper end of this link is pivotally connected to an ear 177 depending from the front end of the feed bar 167. A block 178 is mounted on the pivot bolt 171 and a coil spring 179 is disposed between the block and the bracket 40 and serves to retain the work clamp 163 and the feed dogs 168 alternately in yieldable engagement with the horizontal presser foot 160. When the feed rocker 93 is actuated, back and forth movements will be imparted to the feed dogs 168. Means are provided for rocking the 3-armed lever 172 about its fulcrum 171 to alternately raise and lower the feed bar 167 and the work clamp 163. As above stated, the work clamp 163 is normally held yieldably against the stationary presser foot 160. It will be observed that when the depending arm 175 of the 3-armed lever 172 is swung forwardly the arm 173 will be raised and consequently the front end of the feed bar 167 will be moved upwardly whereby the feed dogs 168 will engage the stationary presser foot 160. As soon as this engagement becomes effective, the pivotal connection between the arm 173 and the link 176 becomes the fulcrum for the lever 172 and consequently upon continued forward movement of the lever arm 175, the pivot bolt 171 will be moved downwardly taking with it the work clamp 163. Thus during the feeding movements of the feed dogs 168, the work clamp 163 will be lowered and thereby freed from the fabrics. When the lever 172 is returned to its normal position the pivot bolt 171 will be first moved upwardly to cause the work clamp 163 to engage the bottom of the foot 160 and upon continued movement of the lever 172 in the same direction the lever will swing about the pivot bolt 171 and move the forward end of the feed bar 167 downwardly. As soon as the work clamp 163 engages the presser foot 160, the upward movement of the pivot bolt 171 will be stopped and the work clamp 163 will be yieldably engaged with the presser foot by the coil spring 179. In order to actuate the lever 172 and thereby impart the up and down movements to the 4-motion feed dogs 168, I have pivotally connected the lower end of the lever arm 175 to the rear end of a longitudinally extending link 180. The rear end of this link is pivotally connected to the lower end of a rock arm 181 which is disposed within the vertical or drop arm 12 of the frame and is fixedly connected at its upper end to the left hand end of the shaft 103 which is journaled in the front horizontal arm 11 of the frame. Fixed to the right hand end of the shaft 103, is a rock arm 182 which extends rearwardly into the standard 5 of the frame and has its rear end pivotally connected to a link or strap 183 which cooperates at its rear end with an eccentric 184 fixed to the main shaft 28.

The seamed fabrics after being trimmed are fed rearwardly under the horizontal presser foot 160 by the feed dogs 168, the initially formed seam, which includes the stitches $c$ and the trimmed edge portions $a$ and $b$, being fed under the opening 162 of said presser foot and under a guide slot 185 which is formed in said foot and extends forwardly of said opening 162 and is in communication therewith. The marginal portions $d$ and $e$ on opposite sides of the line of stitches $c$ are projected upwardly through the opening 162 in the presser foot so as to form the ridge $d$ in the fabrics. For this purpose, I have provided a vertically reciprocable plunger or ridge forming device 186 which is in the nature of a finger mounted on the rear end of a lever 187 which is disposed in a longitudinal slot 188 formed in the feed bar 167. This lever 187 is pivotally connected intermediate its ends by a pivot bolt 189 to said feed bar 167 and the rear end of this lever is pivotally connected by a link 190 to the arm 174 of the 3-armed lever 172. Thus when the lever 172 is oscillated so as to swing the arm 173 thereof upwardly to raise the feed dogs into engagement with the presser foot, the arm 174 will be swung downwardly and through the medium of a link 190 the plunger lever 187 will be swung upwardly so as to project the finger 186 into the opening 162 of the horizontal foot 160, and thereby form the ridge $d$ in the previously seamed and trimmed fabrics. It will also be observed that the ridge forming device 186 is movable with the feed bar 167 and consequently four motions are imparted to said device, viz., up and down and back and forth. The upward movement and the rearward movement of the device function to intermittently raise the seamed fabrics and form the ridge, and also to maintain the proper height of the ridge whereby the needle of the rear stitch forming mechanism will penetrate the ridge along a line parallel to but below the trimmed edges of the fabrics.

The rear stitch forming mechanism which forms the line of stitches $g$ in the ridge $d$ includes a horizontally disposed pivot shaft 191 which is fixed to the head 9 and has its longitudinal axis located in the line of feed of the material and directly above the ridge-receiving opening 162 of the stationary presser foot 160. Journaled on this pivot shaft 191 is a bell crank lever 192 which includes a needle arm 193 and an actuating arm 194. A curved needle 195 is fixed to the needle arm 193 and cooperates with a rotary hook 196 rotatably mounted on a shaft 197 journaled in the lower end of the stitching head 9. The actuating arm 194 is pivotally connected to the lower end of a link 198. The upper end of the link 198 is journaled on a crank 199 of a crank shaft 200 located in the upper part of the head 9 and in alinement with the main shaft 28. One end of the crank shaft 200 is journaled in a lug 201 formed integral with the stitching head 9, and the other end of said crank shaft has a telescopic connection with the end of the main shaft 28 which projects into the head and is rotatably connected therewith through the medium of a set screw 202 which engages a groove 203 formed in the main shaft 28. The hook shaft 197 is driven from the main shaft 28 through the medium of an endless chain 204 which surrounds gears 205 and 206 which are respectively fixed to the crank shaft 200 and hook shaft 197. It will thus be seen that the path of travel of the needle 196 is in a plane at right angles to the line of feed, and directly in rear of the ridge forming device 186. Cooperating with the needle 196 is a movable needle guard 207 which is clamped to a sleeve 208 journaled on the cross shaft 191. Fixed to the sleeve 208 is a depending arm 209 which is oscillated from the main shaft 28 in timed relation to the movement of the needle arm 193 but having a lesser stroke than said arm. In order to oscillate the arm 209, I have mounted an eccentric 210 on the crank shaft 200 and cooperating with this eccentric is a link or strap 211 which is pivotally connected as at 212 to a block 213 which is slidably mounted in a bearing formed in the stitching head 9. The outer end of the block 213 is pivotally connected to one end of a link 214, the other end of the link being pivotally connected to a rock arm 215 fixed to the upper end of a vertical shaft 217 which is journaled in upper and lower bearing lugs 218 and 219 formed on the rear face of the stitching head 9. Fixed to the lower end of the rock shaft 217 is a rock arm 220 having a pin 221 rigidly connected therewith. The pin 221 engages a forked end 222 of a lever 223 which is fulcrumed on a screw 224 to the bottom of the bearing lug 219. The end of the lever 223 opposite the fork 222 is provided with an upstanding ball 225 which is engageable in a socket 226 formed in the lower end of the rock arm 209. Thus when the main shaft 28 is rotated, the eccentric 210 will oscillate the shaft 217 which through the toggle lever connection 220—223 will oscillate the rock arm 209 as well as the needle guard 207.

In order to assist the main horizontal feed dogs 168 and the horizonal presser foot 160 in presenting the ridge $d$ to and beyond the needle 196, I have provided on the head 9 of the main frame a 4-motion vertical top feed dog 227 and a cooperating vertical presser foot 258. The feed dog 227 is provided with a horizontally disposed shank 229 which is fulcrumed intermediate its ends on a pivot screw 230 secured to the under side of a plate 231. The plate 231 is mounted for horizontal sliding movements in the line of feed between the ribs 232 and 233 formed on the lower end of the bearing lug 219. In order to reciprocate the plate 231 and thereby impart backward and forward movements to the feed dog 227, I have attached to one side of said plate a pivot screw 234 which is slidably engaged with a fork 235 formed on the lower end of the lower arm 236 of a lever 237. The lever 237 is fulcrumed intermediate its ends on a pivot screw 238 fixed to a plate 239 secured to the upper and lower bearing lugs 218 and 219. The upper arm 240 of said lever is provided with a longitudinal slot 241. A bell crank lever 242 is fulcrumed at its angle on a pivot pin 243 fixed to the stitching head 9. This lever 242 includes a forked arm 244 which extends forwardly into the stitching head 9. A block 245 is slidably mounted in the forked arm 244 and receives an eccentric 246, the rotation of which causes the arm 244 to be oscillated up and down. The other arm 247 of the bell crank lever 242 extends downwardly and overlaps the upper arm 240 of the lever 237, and is provided with a longitudinal slot 248. A pivot pin 249 extends across the slots 241 and 248, is adjustable along said slots, and is adapted to be clamped in any adjusted position by a clamp screw 250. By means of this pivot pin 249, motion is transmitted from the bell crank lever 242 to the lever 237 and from the lever 237 to the slidable plate 231 to which the feed dog 227 is connected. By means of the pin 249 and clamping screw 250 being adjustable along the lever arms 240 and 247, the length of the feeding stroke of the feed dog 227 may be readily adjusted. In order to impart lateral movements to the top feed dog 227, I have provided the rear end of the shank 229 with a fork 251 which is engaged by a pin 252 which is rigidly connected to and depends from the crank arm 220, said pin extending downwardly through an opening 253 in the plate 231. Thus when the vertical shaft 217 is oscillated, the crank arm 220 through the medium of the pin 252 will rock the shank 229 and thereby reciprocate the feed dog 227 laterally.

The ridge $d$ which is formed in the seamed fabrics by the plunger 196 is guided rearwardly from the trimming mechanism to a point in rear of the plunger and past the vertical feed dog 227 and the upper needle 196, by a rearwardly extending guide 254 comprising spaced side walls 255 and 256, and a top 257. The side wall 255 is provided with an opening through which the top feed dog 227 projects.

Cooperating with the top feed dog 227 is the vertical presser foot 258 which is rigidly connected to a vertically disposed lever 259 fulcrumed at its upper end on a pivot screw 260 on the stitching head 9. A horizontally disposed pin 261 is fixedly secured to the stitching head 9 and extends through an opening in the presser foot lever 259 located below the pivot screw 260 thereof, the opening being of sufficient size so as to permit free swinging movement of the lever. The outer end of the pin 261 is threaded for engagement with a nut 262 and a coil spring 263 is disposed around the pin between the lever 259 and the nut 262 for yieldably urging the presser foot laterally toward the top feed dog 227. This presser foot 258 projects through an opening in the wall 256 of the guide 254 so as to cooperate with the ridge $d$ and with the top feed dog 227 at a point in rear of the plunger 186.

The cover plate

The cover plate 39 includes an attaching plate 64 to which the cover plate is hingedly connected at its front end by a transverse pivot pin 265. The cover plate is normally seated in grooves 266, 266 formed in the upper edges of the side walls 36, 37 of the work arm 13, as shown particularly in Figure 2. The attaching plate is secured to the rear wall of the vertical arm 12 by screws 267, and is formed with thread slots 268, 269 which extend inwardly from opposite sides and terminate in spaced thread guide eyes 270, 271, one for the needle thread 272 and the other for the looper thread 273. The walls 36 and 37 of the work arm are recessed as at 274 under the hinge pin 265 and slots 268, 269 to permit the threads 272, 273 to be easily directed into the work arm and to the needle 50 and looper 51 respectively. The cover plate is disposed in a horizontal plane below the top of the front vertical feed dog 84 and cooperating vertical guide 85 and vertical presser foot 86, and the rear end of said plate terminates in front of the first seam forming mechanism. The rear end of the plate is provided with an upstanding transversely disposed wall 275 having a centrally located guiding slot 276 extending downwardly from the upper edge thereof, the wall being preferably attached to the plate by ears 277 and screws 278. The bottom of the slot 276 substantially registers with the shelf 110 of the vertical work guide 85. This slot 276 guides the downturned edge portions of the fabrics to the front feed dog 84, guide 85, and foot 86.

The end cap

The end cap 38 includes two sheet metal side wings 279 and 280, the former being formed with the opening 154 which registers with and partially receives the outlet end of the chute 145 which directs the trimmed off strips $s$ outwardly from the work arm. The wings are fitted to cut-out portions 281, 282 in the rear ends of the walls 36 and 37 of the work arm, and are provided at their rear ends with inwardly extending end walls 283, 284 which are pivoted to a vertical pintle 285 mounted on the post 40$^b$ of the removable bracket 40 so as to permit the cap sections or wings to be swung laterally and outwardly. The wings are provided along their upper edges with inwardly extending work supporting flanges 286, 286 and the inner edges of these flanges are recessed to conjointly receive therebetween the work presenting mechanisms located in the work arm. The cover plate is normally retained in its operative or closed position as shown in Figure 1, by spring latches shown in Figure 35. To this end, the rear face of the wall 275, on opposite sides of the guiding slot 276 therein, is provided with latch plates 287, 287 having recesses 288, 288 in their upper edges for receiving downwardly extending latch lugs 289, 289 mounted on the front ends of the work supporting flanges 286. The lugs 289 readily spring into the recesses 288 owing to the inherent resiliency of the sheet metal wings.

Thread guide

The needle thread 272 and the looper thread 273 which are concatenated to form the first line of stitches c are led from their respective supplies along a thread guiding element 290 which is attached to the rear face of the front horizontal arm 11, as shown in Figure 1, to thereby maintain said threads out of contact with the right arm of the operator which is located under said front horizontal arm. After leaving the left hand end of the thread guiding element 290, these threads respectively pass through tensions 291 and 292 which are secured to the rear face of the front horizontal arm 11 and from these tensions the threads pass into the work supporting arm 13 as previously described.

Needle thread control

In order to take up the needle thread 272 during the penetrating stroke of the needle and thereby avoid the needle thread whipping around the point of the needle, I have provided a vibratory control means which includes a collar 293 which is fixed to the needle shaft 45. A radially extending take-up finger 294 is fixed to the collar and is disposed under the free end portion 295 of a coil spring 296 which is coiled around the shank of a screw 297 fixed to a plate 298 mounted on the bracket 40. The free end portion 295 of the spring terminates in a thread eye 299, and the other end of said spring is fixed to the plate 298. The spring is coiled so that the free end portion 295 tends to move downwardly against the take-up finger 294. The plate 298 is provided with a laterally extending ear 300 which is perforated to receive the needle thread and is located on the side of the screw 297 opposite the thread 299. Located between the thread eye 299 and the needle 50 is a thread eye 301 which is attached to the cam plate 98. The needle thread is first passed through the perforated ear 300, thence through the thread eye 299 of the spring 296, thence through the thread eye 301, and thence to the heel of the needle. It will therefore be apparent that as the needle 50 participates in its penetrating movement the needle thread will be drawn against the thread eye 301 and at the same time the thread between the eye 301 and the perforated ear 300 will be bowed upwardly by the upward movement of the take-up finger 294 elevating the thread eye 299 to thereby take up the slack in the needle thread during the penetrating stroke of the needle. During retracting movement of the needle the take-up finger 294 will be moved downwardly and the thread eye 299 will follow said finger due to the inherent elasticity of the spring 296.

Looper thread control

Fixed to the bracket 40 on opposite sides of the collar 293 are stationary looper thread guides 302, 302, and fixed to the collar 293 is a radially extending finger 303 which is disposed between the guides 302, 302. The finger 303 oscillates with the needle shaft 45 and cooperates with the thread guides 302, 302 to take up the slack in the looper threads prior to the looper entering the needle thread loop and also during the first part of the backward movement of the looper as will be readily understood.

Oiling devices

It has been found desirable to employ means for automatically feeding oil to the driving connections between the main shaft 28 and the rock shafts 57, 58, 103 and 104 and I have therefore provided means for accomplishing this purpose as shown particularly in Figures 5 and 6. The four driving connections include pivotal connections 304, 305, 306, 307 and 308. Removably positioned in the bottom of the standard 5 is a tray 309 for containing an oil supply which is delivered to said pivotal connections 304—8 by wicks 310. The main shaft 28 is disposed in a plane higher than the rock shafts 57, 58, 103 and 104 and I have found in practice that this main shaft is disposed above the oil supply a distance so great as to prevent the oil from passing upwardly along a wick to the eccentric on the main shaft which operates said driving connections. I have, therefore, secured a container 311 to the inner face of the standard at a point adjacent the main shaft 28 and have lubricated the driving eccentric on said main shaft through the medium of wicks 312 which carry oil from the auxiliary supply or reservoir 311 to said eccentric.

Modified form of looper mechanism

In Figure 46 there is shown a depending rock arm 313 which is rigidly connected to the rock shaft 57 and pivotally connected to the lower end of this rock arm is a rearwardly extending link 314, the front end thereof being pivotally connected to the vertical arm 315 of a bell crank lever 316 which is fulcrumed as at 317 to the post 40ª. The horizontal arm 318 of the bell crank lever is forked for engagement with a slide block 319 fixed to the looper holder 52. Thus upon oscillation of the rock arm 313 the looper holder 52 will be reciprocated vertically for its needle avoiding movements.

Modified construction of end cap and cover plate

In Figures 47 and 48, I have disclosed a modified construction of end cap and cover plate. In these views the end cap 320 is provided with side walls 321, 321, a rear wall 322, and inwardly extending top flanges 323, 323. This end cap is removably attached in place by means of a clamping screw 324 which passes through an opening in the rear wall 322 and engages in a threaded opening formed in the upper end of a post 325 extending upwardly from the bracket 40. The cover plate 326 is hingedly connected at its forward end in the same manner as the cover plate 39. Attached to the rear end of the cover plate 326 is a vertical wall 327 which extends transversely of the work supporting arm 13. Preferably this wall is made in two pieces and each piece is secured to the plate by a screw 328. The wall 327 forms a resultant downwardly extending vertical guiding slot 329 for directing the downturned marginal portions of the fabrics between the front feed dog and presser foot. Attached to the wall 327 or to the separate pieces forming the same are rearwardly extending side walls 330, 330, the rear edges thereof and the adjacent forward edges of the walls 321 of the end cap being struck on an arc concentric with the pivot of the cover plate so as to permit said cover plate to be swung upwardly whenever it is desired to obtain access to the interior of the work supporting arm.

Upper needle guard

In order to prevent the body fabric B on the right hand side of the seam from becoming engaged by the upper needle 195, I have provided a guard as shown in Figs. 2, 8, 12 and 29. This guard comprises a bracket 331 which is attached to the lower right hand side of the stitching head, and a horizontal guard plate 332 which is pivoted to the bracket by a vertical pin 333. A spring 334 is coiled around the pin 333 and has its ends fixedly connected to the bracket and plate respectively. This spring functions to normally retain the guard plate under the upper needle 195 and against the right hand side of the stationary horizontal presser foot 160, and thereby prevent the body fabric B from rising and becoming engaged by the upper needle. When it is desired to thread the upper needle, the guard plate 332 is swung laterally away from the presser foot 160 so as to give free access to the needle, and after the needle has been threaded the guard plate will return automatically to its normal position under the influence of the spring 334.

It is of course to be understood that the details of structure and arrangements of parts may be variously changed and modified without departing from the spirit and scope of my invention.

I claim:—

1. In a sewing machine, the combination with a frame including an overhanging arm having a stitching head at its outer end and a tubular work arm having its free end disposed under said stitching head; of a complete upper stitch forming mechanism including a reciprocatory needle and a cooperating loop taker carried by said head and operating above the work arm; and a complete lower stitch forming mechanism including a reciprocatory needle and a cooperating loop taker carried by said work arm and operating in front of the upper stitch forming mechanism.

2. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; and means carried by the arm for projecting a ridge of material including the seam formed by the lower stitch forming mechanism into position for seaming by the upper stitch forming mechanism.

3. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; and means carried by the arm for projecting a ridge of material including the seam formed by the lower stitch forming mechanism into position for seaming by the upper stitch forming mechanism.

4. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the arm for projecting a ridge of material including the seam formed by the lower stitch forming mechanism into position for seaming by the upper stitch forming mechanism; and means carried by the stitching head and located in rear of the ridge projecting means for presenting the ridge of material to the upper stitch forming mechanism.

5. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the work arm for trimming the downturned marginal portions of said fabrics; and means carried by the arm for projecting a ridge of material including the seam formed by the lower stitch forming mechanism into position for seaming by the upper stitch forming mechanism.

6. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabric to the lower stitch forming mechanism; means carried by the arm for projecting a ridge of material including the seam formed by the lower stitch forming mechanism into position for seaming by the upper stitch forming mechanism; and means carried by the stitching head and located in rear of the ridge projecting means for presenting the ridge of material to the upper stitch forming mechanism; said work presenting mechanisms each including a vertical needle plate, a vertical presser foot cooperating with the plate, and a vertical 4-motion feed dog cooperating with the foot.

7. In a sewing machine, the combination with a frame including an overhanging arm having stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; said stitch forming mechanisms each including an oscillatory curved needle, the fulcrum for the upper needle being located above the path of needle travel, and the fulcrum for the lower needle being located below the path of needle travel; means carried by the work arm for presenting downturned marginal portions of fabrics to the lower stitch forming mechanism; means carried by the work arm for trimming the downturned marginal portions of said fabrics; means carried by the arm for projecting a ridge of material including the seam formed by the lower stitch forming mechanism into position for seaming by the upper stitch forming mechanism; and means carried by the stitching head and located in rear of the ridge projecting means for presenting the ridge of material to the upper stitch forming mechanism; the upper needle having its point of penetration located above the trimmed edges of the fabrics and below the line of stitches formed by the lower stitch forming mechanism.

8. In a sewing machine, the combination with a frame including an overhanging arm having a stitching head at its outer end and a tubular work arm having its free end disposed under said stitching head; of a complete upper stitch forming mechanism including a reciprocatory needle and cooperating loop taker carried by said head and operating above the work arm; and a complete lower stitch forming mechanism including a reciprocatory needle and a cooperating loop taker carried by said work arm and operating in front of the upper stitch forming mechanism and entirely within the confines of the cross sectional area of said arm.

9. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism and entirely within the confines of the cross sectional area of said arm; means mounted within the work arm and disposed entirely within the cross sectional area thereof for presenting downturned marginal portions of fabrics to the lower stitch forming mechanism; means carried by the arm for projecting a ridge of material including the seam formed by the lower stitch forming mechanism into position for seaming by the upper stitch forming mechanism; and means carried by the stitching head and located in rear of the ridge projecting means for presenting the ridge of material to the upper stitch forming mechanism.

10. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism and entirely within the confines of the cross sectional area of said arm; means mounted within the work arm and disposed entirely within the cross sectional area thereof for presenting downturned marginal portions of fabrics to the lower stitch forming mechanism; means carried by the arm for projecting a ridge of material including the seam formed by the lower stitch forming mechanism into position for seaming by the upper stitch forming mechanism; means carried by the stitching head and located in rear of the ridge projecting means for presenting the ridge of material to the upper stitch forming mechanism; and means for imparting feeding movements to both feed dogs in unison including a feed rocker lever fulcrumed in the arm to oscillate about an axis extending transversely of the arm and separate connections between the feed dogs and said feed rocker lever.

11. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the arm for projecting a ridge of material including the seam formed by the lower stitch forming mechanism into position for seaming by the upper stitch forming mechanism; means carried by the stitching head and located in rear of the ridge projecting means for presenting the ridge of material to the upper stitch forming mechanism, said upper work presenting mechanism including a horizontal presser foot having a ridge-receiving slot, a vertical needle plate and a cooperating vertical presser foot located above the horizontal foot for cooperation with the ridge of fabrics, and a vertical feed dog cooperating with said vertical foot; and a horizontal feed dog carried by the arm and cooperating with the horizontal foot on opposite sides of the ridge-receiving slot thereof.

12. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism and comprising a vertical needle plate and a cooperating presser foot, and a vertical feed dog cooperating with the vertical foot; means carried by the arm for projecting a ridge of material including the seam formed by the lower stitch forming mechanism into position for seaming by the upper stitch forming mechanism; means carried by the stitching head and located in rear of the ridge projecting means for presenting the ridge of material to the upper stitch forming mechanism, said upper work presenting mechanism including a horizontal presser foot having a ridge-receiving slot, a vertical needle plate and a cooperating vertical presser foot located above the horizontal foot for cooperation with the ridge of fabrics, and a vertical feed cooperating with said vertical foot, and a horizontal feed carried by the arm and cooperating with the horizontal foot on opposite sides of the ridge-receiving slot thereof.

13. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the work arm for trimming the downturned marginal portions of said fabrics; means for directing the trimmed off strips outwardly from the arm; and means carried by the arm for projecting a ridge of material including the seam formed by the lower stitch forming mechanism into position for seaming by the upper stitch forming mechanism.

14. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the work arm for trimming the downturned marginal portions of the fabrics; a chute for directing the trimmed off strips outwardly from one side of the arm; and means carried by the arm for projecting a ridge of material including the seam formed by the lower stitch forming mechanism into position for seaming by the upper stitch forming mechanism.

15. In a sewing machine, the combination with a frame including an overhanging arm having a stitching head at its outer end and a tubular work arm having its free end disposed under said stitching head; of a complete upper stitch forming mechanism carried by said head and operating above the work arm; and a complete lower stitch forming mechanism carried by said work arm and operating in front of the upper stitch forming mechanism, said lower stitch forming mechanism comprising an oscillatory needle shaft journaled in the arm and extending lengthwise thereof, a curved needle fixed to the needle shaft to oscillate in a plane transverse to the longitudinal axis of said needle shaft, and a loop taker mounted in said arm for cooperation with said needle.

16. In a sewing machine, the combination with a frame including an overhanging arm having a stitching head at its outer end and a tubular work arm having its free end disposed under said stitching head; of a complete upper stitch forming mechanism carried by said head and operating above the work arm; and a complete lower stitch forming mechanism carried by said work arm and operating in front of the upper stitch forming mechanism, said lower stitch forming mechanism comprising an oscillatory needle shaft journaled in the arm and extending lengthwise thereof, a curved needle fixed to the needle shaft to oscillate in a plane transverse to the longitudinal axis of said needle shaft, a 4-motion threaded looper located within the arm for cooperation with the needle, driving connections between the needle shaft and the looper for imparting loop-taking and loop-shedding movements to the looper, and other means for imparting needle-avoiding movements to the looper.

17. In a sewing machine, the combination with a frame including an overhanging arm having a stitching head at its outer end and a tubular work arm having its free end disposed under said stitching head; of a complete upper stitch forming mechanism carried by said head and operating above the work arm; and a complete lower stitch forming mechanism carried by said work arm and operating in front of the upper stitch forming mechanism, said lower stitch forming mechanism comprising an oscillatory needle shaft journaled in the arm and extending lengthwise thereof, a curved needle fixed to the needle shaft to oscillate in a plane transverse to the longitudinal axis of said needle shaft, a looper carrier mounted in the arm for oscillatory movements, a looper holder mounted in the carrier for bodily movements therewith and for radial reciprocatory movements relative thereto, a threaded looper fixed to said holder, driving connections between the shaft and the carrier for oscillating the latter to impart loop-taking and loop-shedding movements to the looper, and other means for reciprocating the carrier to impart needle-avoiding movements to the looper.

18. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said work arm and operating in front of the upper stitch forming mechanism, said lower stitch forming mechanism comprising an oscillatory needle shaft journaled in the arm and extending lengthwise thereof, a curved needle fixed to the needle shaft to oscillate in a plane transverse to the longitudinal axis of said needle shaft, and a loop taker mounted in said arm for cooperation with said needle; and means carried by the work arm for presenting downturned marginal portions of fabrics to the lower stitch forming mechanism comprising a vertical needle plate, a vertical presser foot cooperating with the plate, a 4-motion vertical feed dog cooperating with the foot, means for reciprocating the feed dog longitudinally of the work arm, and means operated by the needle shaft for reciprocating the feed dog laterally towards and from the presser foot.

19. In a sewing machine, the combination with a frame including an overhanging arm having a stitching head at its outer end and a tubular work arm having its free end disposed under said stitching head; of a main shaft journaled in the overhanging arm; a complete upper stitch forming mechanism carried by said head and operating above the work arm; driving connections between one end of the main shaft and said upper stitch forming mechanism; a complete lower stitch forming mechanism carried by said work arm and operating in front of the upper stitch forming mechanism and comprising an oscillatory needle shaft journaled in the arm and extending lengthwise thereof, a curved needle fixed to the needle shaft to oscillate in a plane transverse to the longitudinal axis of said needle shaft, a 4-motion threaded looper located within the arm for cooperation with the needle, driving connections between the needle shaft and the looper for imparting loop-taking and loop-shedding movements to the looper, rock shafts journaled in the arm, driving connections between the needle shaft and one rock shaft, driving connections between the other rock shaft and the looper for imparting needle avoiding movements thereto, and separate driving connections between the other end of the main shaft and the respective rock shafts.

20. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said work arm and operating in front of the upper stitch forming mechanism, said lower stitch forming mechanism comprising an oscillatory needle shaft journaled in the arm and extending lengthwise thereof, a curved needle fixed to the needle shaft to oscillate in a plane transverse to the longitudinal axis of said needle shaft, and a loop taker mounted in said arm for cooperation with said needle; means carried by the work arm for presenting downturned marginal portions of fabrics to the lower stitch forming mechanism; and means for trimming the downturned marginal portions of the fabrics including a horizontally reciprocable trimmer blade actuated by the needle shaft.

21. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the arm for projecting a ridge of material including the seam formed by the lower stitch forming mechanism into position for seaming by the upper stitch forming mechanism; means carried by the stitching head and located in rear of the ridge projecting means for presenting the ridge of material to the upper stitch forming mechanism; said lower work presenting mechanism including a vertical needle plate, a vertical presser foot cooperating with the plate, and a vertical 4-motion feed dog cooperating with the foot; and means for trimming the downturned marginal portions of the fabrics including a ledger blade fixed to the needle plate, and a horizontally reciprocatory trimmer blade cooperating with the ledger blade.

22. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said arm and operating in front of the upper stitch forming mechanism; means carried by the work arm for presenting downturned marginal portions of fabrics to the lower stitch forming mechanism; means carried by the arm for projecting a ridge of material including the seam formed by the lower stitch forming mechanism into position for seaming by the upper stitch forming mechanism; means carried by the stitching head and located in rear of the ridge projecting means for presenting the ridge of material to the upper stitch forming mechanism; said lower work presenting mechanism including a vertical needle plate, a vertical presser foot cooperating with the plate, and a vertical 4-motion feed dog cooperating with the foot, means for trimming the downturned marginal portions of the fabrics including a ledger blade fixed to the needle plate, and a horizontally reciprocatory trimmer blade cooperating with the ledger blade, and a chute located within the arm for directing the trimmed off strips outwardly from one side of the arm.

23. In a sewing machine, the combination with a frame including an overhanging arm having a stitching head at its outer end and a tubular work arm having its free end disposed under said stitching head; of a complete upper stitch forming mechanism carried by said head and operating above the work arm; a complete lower stitch forming mechanism carried by said work arm and operating in front of the upper stitch forming mechanism; said lower stitch forming mechanism comprising an oscillatory needle shaft journaled in the arm and extending lengthwise thereof, a curved needle fixed to the needle shaft to oscillate in a plane transverse to the longitudinal axis of said needle shaft, and a loop taker mounted in said arm for cooperation with said needle, means carried by the work arm for presenting downturned marginal portions of fabrics to the lower stitch forming mechanism; means for trimming the downturned marginal portions of the fabrics including a horizontally reciprocable trimmer blade actuated by the needle shaft, and a chute located within the arm for directing the trimmed off strips outwardly from one side of the arm.

24. In a sewing machine, the combination with a frame including an overhanging arm having a stitching head at its outer end and a tubular work arm having its free end disposed under said stitching head; of a main shaft journaled in the overhanging arm; a complete upper stitch forming mechanism including a reciprocatory needle and a cooperating loop taker carried by said head and operating above the work arm; driving connections between one end of the main shaft and said upper stitch forming mechanism; a complete lower stitch forming mechanism including a reciprocatory needle and a cooperating loop taker carried by said work arm and operating in front of the upper stitch forming mechanism; and driving connections between the other end of the main shaft and the lower stitch forming mechanism.

25. In a sewing machine, the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; of a main shaft rotatably supported in the overhanging arm and standard; a complete upper stitch forming mechanism carried by the stitching head and operating above the work arm; a complete lower stitch forming mechanism mounted in the work supporting arm adjacent the free end thereof and in front of the upper stitch forming mechanism; driving connections between one end of the main shaft and the upper stitch forming mechanism; and driving connections between the other end of the main shaft and the lower stitch forming mechanism including a plurality of rock shafts journaled in the front horizontal arm and extending longitudinally thereof, operating connections between the lower stitch forming mechanism and the adjacent ends of the rock shafts, and operating connections between the main shaft and the other ends of the rock shafts.

26. In a sewing machine, the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; of a main shaft rotatably supported in the overhanging arm and standard; a complete upper stitch forming mechanism carried by the stitching head and operating above the work arm; a complete lower stitch forming mechanism mounted in the work supporting arm adjacent the free end thereof and in front of the upper stitch forming mechanism and comprising an oscillatory needle shaft journaled in said arm and extending longitudinally thereof, a curved needle fixed to the shaft for oscillations in a plane transverse to the longitudinal axis of the shaft, and a loop taker cooperating with said needle; driving connections between one end of the main shaft and the upper stitch forming mechanism; and driving connections between the other end of the main shaft and the lower stitch forming mechanism including a plurality of rock shafts journaled in the front horizontal arm and extending longitudinally thereof, operating connections between the needle shaft and the adjacent end of one rock shaft, operating connections between the loop taker and the adjacent end of the other rock shaft, and operating connections between the main shaft and the other ends of the rock shafts.

27. In a sewing machine, the combination with a frame comprising a standard, an overhanging arm supported by the standard and having a stitching head at its outer end, and a work arm supported by the standard and including a front horizontal arm and a work presenting arm extending rearwardly from the end of the horizontal arm opposite the standard and having its free end terminating under the stitching head; of a main shaft rotatably supported in the overhanging arm and standard; a 4-motion feed dog mounted in the work supporting arm adjacent the free end thereof, a pair of rock shafts journaled in the front horizontal arm and extending longitudinally thereof, connections between the feed dog and the adjacent end of one of said rock shafts for imparting back and forth movements to the dog, connections between the feed dog and the adjacent end of the other rock shaft for imparting the other movements to the feed dog, and driving connections between the main shaft and said rock shafts.

28. In a sewing machine, the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; of a main shaft rotatably supported in the overhanging arm and standard; front and rear 4-motion feed dogs mounted in the work supporting arm adjacent the free end thereof, three rock shafts journaled in the front horizontal arm and extending longitudinally thereof, connections between both feed dogs and the adjacent end of one of said rock shafts for imparting back and forth movements to said dogs, and separate connections between the dogs and the adjacent ends of the other rock shafts for imparting the other movements to the said feed dogs.

29. In a sewing machine, the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; of a main shaft rotatably supported in the overhanging arm and standard; a front vertical 4-motion feed dog mounted in the supporting arm adjacent the free end thereof, a horizontal 4-motion feed dog mounted in the work supporting arm in rear of the front dog, three rock shafts journaled in the front horizontal arm and extending longitudinally thereof, connections between both feed dogs and the adjacent end of one rock shaft including a single feed rocker for imparting backward and forward movements to both dogs in unison, connections between the front feed dog and the adjacent end of the second rock shaft for imparting lateral reciprocations to said dog, and connections between the rear dog and the adjacent end of the third rock shaft for imparting up and down movements to said dog.

30. In a sewing machine, the combination with a frame including an overhanging arm having a stitching head at its outer end and a tubular work arm having its free end disposed under said stitching head; of a main shaft journaled in the overhanging arm; a complete upper stitch forming mechanism carried by said head and operating above the work arm; driving connections between one end of the shaft and the upper stitch forming mechanism; a complete lower stitch forming mechanism carried by said work arm and operating in front of the upper stitch forming mechanism; driving connections between the other end of the shaft and the lower stitch forming mechanism and extending within said work arm; means carried by the work arm for presenting downturned marginal portions of fabrics to the lower stitch forming mechanism including a lower vertical 4-motion feed dog and a cooperating vertical presser foot; means carried by the arm for projecting a ridge of material including the seam formed by the lower stitch forming mechanism into position for seaming by the upper stitch forming mechanism; a stationary horizontal presser foot carried by the head and formed with an opening through which the ridge of material is projected; and means for presenting the ridge of material to the rear stitch forming mechanism including a 4-motion horizontal lower feed dog cooperating with the stationary horizontal presser foot on opposite sides of the ridge of the material, a 4-motion vertical upper feed dog carried by the head and disposed above the presser foot for cooperation with one side of said ridge of material, and a vertical presser foot carried by the head and disposed above the horizontal presser foot for cooperation with said ridge of material and said vertical feed dog; driving connections between the shaft and said lower feed dogs extending within and along the work arm; and driving connections between the shaft and the upper feed dog.

31. In a sewing machine, the combination with a frame including an overhanging arm having a stitching head at its outer end and a tubular work arm having its free end disposed under said stitching head; of a main shaft journaled in the overhanging arm; a complete upper stitch forming mechanism carried by said head and operating above the work arm; driving connections between one end of the shaft and the upper stitch forming mechanism; a complete lower stitch forming mechanism carried by said work arm and operating in front of the upper stitch forming mechanism; driving connections between the other end of the shaft and the lower stitch forming mechanism and extending within said work arm; means carried by the work arm for presenting downturned marginal portions of fabrics to the lower stitch forming mechanism including a lower vertical 4-motion feed dog and a cooperating vertical presser foot; vertically reciprocatory means carried by the arm for projecting a ridge of material including the seam formed by the lower stitch forming mechanism into position for seaming by the upper stitch forming mechanism; a stationary horizontal presser foot carried by the head and formed with an opening through which the ridge of material is projected; and means for presenting the ridge of material to the rear stitch forming mechanism including a 4-motion horizontal lower feed dog cooperating with the stationary horizontal presser foot on opposite sides of the ridge of the material, a 4-motion vertical upper feed dog carried by the head and disposed above the presser foot for cooperation with one side of said ridge of material, and a vertical presser foot carried by the head and disposed above the horizontal presser foot for cooperation with said ridge of material and said vertical feed dog; driving connections between the shaft and said lower feed dogs and ridge forming means extending within and along the work arm; and driving connections between the shaft and the upper feed dog.

32. In a sewing machine, the combination of a tubular work supporting arm, and a stitch forming mechanism including a curved needle pivoted for oscillations in a plane substantially transverse to the longitudinal axis of the arm and operating entirely within the confines of the cross sectional area of the arm, and a loop taker cooperating with the needle and operating entirely within the confines of the cross sectional area of said arm.

33. In a sewing machine, the combination of a tubular work supporting arm, and a stitch forming mechanism including a reciprocatory needle mounted within said arm adjacent the free end thereof and operating entirely within the confines of the cross sectional area thereof, and a 4-motion looper cooperating with said needle and operating entirely within the confines of the cross-sectional area of the arm, said looper having its loop entering and shedding movements longitudinally of said arm.

34. In a sewing machine, the combination with a tubular work supporting arm, an oscillatory shaft journaled in the arm and extending longitudinally thereof, a curved needle fixed to the shaft to oscillate therewith in a plane at right angles to the axis of the shaft, and a loop taker located within the arm for cooperation with the needle.

35. In a sewing machine, the combination with a tubular work supporting arm, an oscillatory shaft journaled in the arm and extending longitudinally thereof, a curved needle fixed to the shaft to oscillate therewith in a plane at right angles to the axis of the shaft, and a loop taker located within the arm for cooperation with the needle, said needle and said loop taker operating entirely within the cross sectional area of the work arm.

36. In a sewing machine, the combination with a tubular work supporting arm, an oscillatory shaft journaled in the arm and extending longitudinally thereof, a curved needle fixed to the shaft to oscillate therewith in a plane at right angles to the axis of the shaft, and a 4-motion threaded looper located within the arm for cooperation with the needle.

37. In a sewing machine, the combination with a tubular work supporting arm, an oscillatory shaft journaled in the arm and extending longitudinally thereof, a curved needle fixed to the shaft to oscillate therewith in a plane at right angles to the axis of the shaft, a 4-motion threaded looper located within the arm for cooperation with the needle, driving connections between the needle shaft and the looper for imparting loop-taking and loop-shedding movements to the looper, and other means for imparting needle-avoiding movements to the looper.

38. In a sewing machine, the combination with a tubular work supporting arm, an oscillatory shaft journaled in the arm and extending longitudinally thereof, a curved needle fixed to the shaft to oscillate therewith in a plane at right angles to the axis of the shaft, a looper carrier mounted in the arm for oscillatory movements, a looper holder mounted in the carrier for bodily movements therewith and for radial reciprocatory movements relative thereto, a threaded looper fixed to said holder, driving connections between the shaft and the carrier for oscillating the latter to impart loop-taking and loop-shedding movements to the looper, and other means for reciprocating the carrier to impart needle-avoiding movements to the looper.

39. In a sewing machine, the combination with a tubular work supporting arm; of a stitch forming mechanism operating entirely within the arm and including an oscillatory shaft journaled in the arm, a curved needle fixed to the shaft to oscillate in a plane transverse to the axis of the shaft, and a loop taker cooperating with the needle; and means operating entirely within the arm for presenting downturned edge portions of body fabrics to the stitch forming mechanism.

40. In a sewing machine, the combination with a tubular work supporting arm; of a stitch forming mechanism operating entirely within the arm and including an oscillatory shaft journaled in the arm, a curved needle fixed to the shaft to oscillate in a plane transverse to the axis of the shaft, a 4-motion threaded looper cooperating with the needle, driving connections between the shaft and the looper for imparting loop-taking and loop-shedding movements to said looper, and means connected to the looper and extending along the arm for imparting needle avoiding movements to the looper; and means operating entirely within the arm for presenting downturned edge portions of body fabrics to the stitch forming mechanism.

41. In a sewing machine, the combination with a tubular work supporting arm; of a stitch forming mechanism operating entirely within the arm and including an oscillatory shaft journaled in the arm, a curved needle fixed to the shaft to oscillate in a plane transverse to the axis of the shaft, and a loop taker cooperating with the needle; and means operating entirely within the arm for presenting downturned edge portions of body fabrics to the stitch forming mechanism comprising a vertical presser foot disposed adjacent the free end of the arm, a vertical needle plate cooperating with the foot and needle, and a vertical feed dog cooperating with the foot.

42. In a sewing machine, the combination with a tubular work supporting arm; of a stitch forming mechanism operating entirely within the arm and including an oscillatory shaft journaled in the arm, a curved needle fixed to the shaft to oscillate in a plane transverse to the axis of the shaft, and a loop taker cooperating with the needle; and means operating entirely within the arm for presenting downturned edge portions of body fabrics to the stitch forming mechanism comprising a vertical presser foot disposed adjacent the free end of the arm, a vertical needle plate cooperating with the foot and needle, a 4-motion vertical feed dog cooperating with the foot, means independent of the shaft for imparting backward and forward movements to the feed dog, and means actuated by the shaft for imparting lateral movements to said feed dog.

43. In a sewing machine, the combination with a frame including a standard, and a work arm supported at one end from the standard and having its other end free; of a main shaft journaled in the standard; a complete stitch forming mechanism including a reciprocatory needle and a cooperating loop taker mounted within the arm adjacent the free end thereof; and driving connections extending within the standard and work arm for actuating said stitch forming mechanism from the main shaft comprising a pair of rock shafts journaled in the arm, separate driving connections between the main shaft and the rock shafts, and driving connections between the rock shafts and the needle and loop taker.

44. In a sewing machine, the combination with a frame including a standard, and a work arm including a front horizontal arm connected at one end to the standard, a drop arm connected to the other end of the horizontal arm, and a rearwardly extending work supporting arm connected to the lower end of the drop arm; of a main shaft journaled in the standard; a complete stitch forming mechanism including a reciprocatory needle and a cooperating loop taker mounted within the work supporting arm adjacent the free end thereof; and driving connections extending within the standard and work arm for actuating said stitch forming mechanism from the main shaft.

45. In a sewing machine, the combination with a frame including a standard, and a work arm including a front horizontal arm connected at one end to the standard, a drop arm connected to the other end of the horizontal arm, and a rearwardly extending work supporting arm connected to the lower end of the drop arm; of a main shaft journaled in the standard; a complete stitch forming mechanism including a reciprocatory needle and a cooperating loop taker mounted within the work supporting arm adjacent the free end thereof; and driving connections extending within the standard and work arm for actuating said stitch forming mechanism from the main shaft comprising a pair of rock shafts journaled in the front horizontal arm, separate driving connections between the main shaft and the rock shafts, and driving connections between the rock shafts and the needle and loop taker.

46. In a sewing machine, the combination with a frame including a standard, and a work arm including a front horizontal arm connected at one end to the standard, a drop arm connected to the other end of the horizontal arm, and a rearwardly extending work supporting arm connected to the lower end of the drop arm; of a main shaft journaled in the standard; a needle shaft journaled in the work supporting arm and extending longitudinally thereof; a curved needle fixed to the needle shaft for movements in a plane at right angles to the longitudinal axis of the needle shaft; a 4-motion threaded looper mounted in the work supporting arm for cooperation with the needle; driving connections extending within the standard and the work arm for oscillating the needle shaft from the main shaft; driving connections between the needle shaft and the looper for imparting loop-taking and loop-shedding movements to the looper; and other driving connections from the main shaft extending within the standard and work arm for imparting needle avoiding movements to the looper.

47. In a sewing machine, the combination with a frame including a standard, and a work arm including a front horizontal arm connected at one end to the standard, a drop arm connected to the other end of the horizontal arm, and a rearwardly extending work supporting arm connected to the lower end of the drop arm; of a main shaft journaled in the standard; a needle shaft journaled in the work supporting arm and extending longitudinally thereof; a curved needle fixed to the needle shaft for movements in a plane at right angles to the longitudinal axis of the needle shaft; a 4-motion threaded looper mounted in the work supporting arm for cooperation with the needle; a pair of rock shafts journaled in the front horizontal arm; separate driving connections between the main shaft and said rock shafts; driving connections extending within the drop arm for oscillating the needle shaft from one of said rock shafts; driving connections between the needle shaft and the looper for imparting loop-taking and loop-shedding movements to the looper; and driving connections from the other rock shaft extending within the drop arm and work supporting arm for imparting needle-avoiding movements to the looper.

48. In a sewing machine, the combination with a frame including a work arm, of a bracket removably attached rigidly to said arm, and a complete stitch forming mechanism supported on said bracket and removable with the bracket from the arm as a unit, said stitch forming mechanism including an oscillatory needle shaft journaled on the bracket, a needle fixed to said shaft, and a complemental stitch forming mechanism mounted on the bracket for cooperation with the needle.

49. In a sewing machine, the combination with a frame including a work arm, of a bracket removably attached rigidly to said arm, and a complete stitch forming mechanism supported on said bracket and removable with the bracket from the arm as a unit, said stitch forming mechanism including an oscillatory needle shaft journaled on the bracket, a needle fixed to said shaft, a looper cooperating with the needle, and driving connections between the needle shaft and the looper for oscillating the latter.

50. In a sewing machine, the combination with a frame including a standard, an overhanging arm having a stitching head at its outer end, and a tubular work arm having its free end disposed under said head; of a feed dog mounted in said work arm adjacent the free end thereof and having a vertically disposed feed surface; a vertical presser foot mounted in the arm for cooperation with said feed dog, a spring for normally urging said foot towards said feed dog; and a treadle-controlled means including a lever extending within and longitudinally of the arm for moving said foot laterally away from said feed dog.

51. In a sewing machine, the combination with a frame including a standard, an overhanging arm having a stitching head at its outer end, and a work arm having its free end disposed under said head; of a vertical 4-motion feed dog mounted in said arm adjacent the free end thereof; a vertical presser foot mounted in the arm for cooperation with said feed dog and fixed to a vertical lever fulcrumed intermediate its ends in said work arm; a spring for normally urging said foot towards said feed dog; a horizontal rock arm fixed to said lever; and a treadle-controlled means including a lever extending within and longitudinally of the work arm and having a loose connection with the horizontal arm of the presser foot lever for moving said foot laterally away from said feed dog.

52. In a sewing machine, the combination with a frame including a standard, an overhanging arm having a stitching head at its outer end and a work arm having a front horizontal arm connected to the standard and a work supporting arm extending rearwardly from the end of the front horizontal arm opposite the standard and having its free end terminating under the stitching head; of a vertical feed dog and a cooperating vertical foot mounted in the work arm adjacent the free end thereof; a spring for normally urging said foot against the feed dog; and manually operable means for moving the foot laterally away from the feed dog comprising connections extending along the arm from the standard to the foot, and a treadle connected to said connections at the standard.

53. In a sewing machine, the combination with a frame including a standard, an overhanging arm having a stitching head at its outer end and a work arm having a front horizontal arm connected to the standard and a work supporting arm extending rearwardly from the end of the front horizontal arm opposite the standard and having its free end terminating under the stitching head; of a vertical feed dog and a cooperating vertical foot mounted in the work arm adjacent the free end thereof; a spring for normally urging said foot against the feed dog; and manually operable means for moving the foot laterally away from the feed dog comprising connected levers respectively fulcrumed on the standard, front horizontal arm, and work supporting arm, and a treadle connected to the lever on the standard.

54. In a sewing machine, the combination with front and rear stitch forming mechanisms, one of said mechanisms operating entirely below the general plane of the fabrics to be seamed and the other operating entirely above the general plane of said fabrics; means for presenting downturned marginal portions of fabrics to the lower stitch forming mechanism comprising a vertical presser foot located at one side of the vertical edge portions of the fabrics, a vertical feed dog located at the other side of said vertical edge portions and cooperating with the foot to feed the fabrics past the front stitch forming mechanism; means located intermediate said stitch forming mechanisms for projecting a ridge of the fabrics including the formed seam into position for seaming by the rear stitch forming mechanism; and a treadle-controlled means for bodily moving the front presser foot laterally away from its cooperating feed dog to permit insertion therebetween of the vertical edge portions of the fabrics.

55. In a sewing machine, the combination with a feed rocker, of a feed bar pivoted thereto, a vertically movable ridge forming finger pivoted to the feed bar, means for oscillating the feed rocker to impart back and forth movements to the feed bar and finger, and means for swinging said bar and finger for raising and lowering the same.

56. In a sewing machine, the combination with a feed rocker, of a feed bar pivoted thereto, a vertically movable ridge forming finger pivoted intermediate its ends to the feed bar, means for oscillating the feed rocker to impart back and forth movements to the feed bar and finger, a 3-armed lever, a link connection between the feed bar and one arm of the lever, a link connection between the finger and another arm of the lever, and means connected to the third arm of the lever for swinging said bar and finger for raising and lowering the same.

57. In a sewing machine, the combination with a work support, of a stationary horizontal foot disposed above the work support, a horizontal work clamp mounted on the work support and cooperating with the foot and provided with spaced feed slots and an intermediate slot, spaced supporting arms pivotally connected to the work support and to the work clamp, a pivot bolt connecting the arms, a spring interposed between the bolt and the work support for yieldingly retaining the work clamp in engagement with the foot, a feed rocker fulcrumed on the work support, a longitudinally slotted feed bar pivoted at one end to said rocker and extending above the pivot bolt and between the clamp supporting arms, a feed dog fixed to the free end of the feed bar and projecting through the feed slots of the work clamp into cooperative relation with the foot, a ridge forming finger disposed within the slot of the feed bar and pivotally connected intermediate its ends to said feed bar, the front end of the finger projecting upwardly through the intermediate slot of the clamp plate, a 3-armed lever fulcrumed on the pivot bolt of the clamp supporting arms and comprising forwardly and rearwardly extending arms and a depending arm, a link connection between the forwardly extending arm and the free end of the feed bar, a link connection between the rearwardly extending arm and the rear end of the ridge forming finger, means for oscillating the feed rocker for imparting back and forth movements to the feed dog and ridge forming finger, and means connected to the depending arm of the 3-armed lever for alternately raising and lowering the work clamp, and the feed dog and finger.

58. In a sewing machine, the combination of a frame including a tubular work supporting arm comprising a bottom, side walls, an end cap element, and a cover plate element; and a work presenting mechanism mounted in the arm and located within the end cap, said work presenting mechanism including a vertical feed dog and a cooperating presser foot extending above the cover plate; one of said elements being provided with a wall extending across the arm in front of the feed dog and foot and having a downwardly extending slot for guiding downturned marginal portions of fabrics to said dog and foot.

59. In a sewing machine, the combination of a frame including a tubular work supporting arm comprising a bottom, side walls, an end cap element, and a cover plate element hinged to the arm at the end opposite the end cap to swing upwardly, and a work presenting mechanism mounted in the arm and located within the end cap, said work presenting mechanism including a vertical feed dog and a cooperating presser foot extending above the cover plate; the end of the cover plate adjacent the end cap being provided with a wall extending across the arm in front of the feed dog and foot and having a downwardly extending slot for guiding downturned marginal portions of fabrics to said dog and foot.

60. In a sewing machine, the combination with a tubular work arm; of a complete stitch forming mechanism operating in said arm including an oscillatory shaft journaled in the arm and extending longitudinally thereof, and a curved needle fixed to the shaft for oscillatory movements in a plane at right angles to the longitudinal axis of the shaft; and means located in the arm and operable by the shaft for taking up the needle thread during the penetrating movement of the needle.

61. In a sewing machine, the combination with a tubular work arm; of a complete stitch forming mechanism operating in said arm including an oscilliatory shaft journaled in the arm and extending longitudinally thereof, and a curved needle fixed to the shaft for oscillatory movements in a plane at right angles to the longitudinal axis of the shaft; and means located in the arm and operable by the shaft for taking up the needle thread during the penetrating movement of the needle, said take-up means comprising a spring take-up finger extending longitudinally of the shaft, an arm extending radially from the shaft and disposed below said finger, and a stationary thread guide located between the needle and the take-up finger.

62. In a sewing machine, the combination with a standard; of a tubular work arm having an open top and including spaced side walls and a bottom supported thereby; an attaching plate secured to the side walls of the arm in spaced relation to the free end of said arm; a cover plate for the arm hingedly connected to the attaching plate to swing upwardly from the work arm; a complete stitch forming mechanism including a needle mounted within said arm at the free end thereof and in front of said cover plate; and means for guiding a needle thread to the needle comprising a slot formed in the attaching plate and extending inwardly from one side thereof, and a recess formed in the upper edge of the adjacent wall of the arm and extending from a point in front of the plate to said slot.

63. In a sewing machine, the combination with a standard; of a tubular work arm having an open top and including spaced side walls and a bottom supported thereby; an attaching plate secured to the side walls of the arm in spaced relation to the free end of said arm; a cover plate for the arm hingedly connected to the attaching plate to swing upwardly from the work arm; a complete stitch forming mechanism including a needle and a cooperating threaded looper mounted within said arm at the free end thereof and in front of said cover plate; and means for guiding a needle thread and a looper thread to the needle and looper respectively comprising slots formed in the attaching plate and extending inwardly from opposite sides thereof, and recesses formed in the upper edges of the adjacent walls of the arm and extending from a point in front of the plate to said slots.

64. In a sewing machine the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; a stitch forming mechanism mounted within the work supporting arm adjacent the free end thereof and including a needle and a cooperating threaded looper; and means for guiding a needle thread and a looper thread along the work arm to said needle and looper respectively.

65. In a sewing machine, the combination with a frame comprising a standard, an overhanging arm supported by the standard and having a stitching head at its outer end, and a work arm supported by the standard and including a front horizontal arm and a work supporting arm extending rearwardly from the end of the horizontal arm opposite the standard and having its free end terminating under the stitching head; a stitch forming mechanism mounted within the work supporting arm adjacent the free end thereof and including a needle and a cooperating threaded looper, and means mounted on the front horizontal arm for guiding a needle thread and a looper thread therealong; and means for guiding said threads into the work supporting arm and to said needle and looper.

66. In a sewing machine, the combination with a frame including a tubular work supporting arm; of a bracket mounted within and extending longitudinally of said arm and removably attached rigidly thereto; and a complete stitch forming mechanism supported on said bracket and removable with the bracket as a unit, said stitch forming mechanism including an oscillatory needle shaft journaled in and extending longitudinally of the bracket, a curved needle fixed to said shaft, and a cooperating loop taker.

67. In a sewing machine, the combination with a frame including a tubular work supporting arm; of a bracket mounted within said arm and removably attached rigidly thereto; a complete stitch forming mechanism including a reciprocatory needle and a threaded looper supported on said bracket and removable with the bracket as a unit, a needle thread controlling means mounted on said bracket and removable therewith, and a looper thread controlling means mounted on said bracket and removable therewith.

HORACE F. GRUMAN.